(12) United States Patent
Uchiyama

(10) Patent No.: US 8,334,488 B2
(45) Date of Patent: Dec. 18, 2012

(54) COOKER

(75) Inventor: Satomi Uchiyama, Nara (JP)

(73) Assignee: Panasonic Corporation, Osaka (JP)

( * ) Notice: Subject to any disclaimer, the term of this patent is extended or adjusted under 35 U.S.C. 154(b) by 237 days.

(21) Appl. No.: 12/809,274

(22) PCT Filed: Dec. 12, 2008

(86) PCT No.: PCT/JP2008/003749
§ 371 (c)(1),
(2), (4) Date: Jun. 18, 2010

(87) PCT Pub. No.: WO2009/078160
PCT Pub. Date: Jun. 25, 2009

(65) Prior Publication Data
US 2011/0198344 A1    Aug. 18, 2011

(30) Foreign Application Priority Data

Dec. 19, 2007  (JP) .................................. 2007-327783

(51) Int. Cl.
*H05B 6/70* (2006.01)
(52) U.S. Cl. ........................................ 219/730; 219/756
(58) Field of Classification Search .................. 219/730, 219/732, 734, 756
See application file for complete search history.

(56) References Cited

U.S. PATENT DOCUMENTS

| | | | |
|---|---|---|---|
| 6,133,558 A | | 10/2000 | Ueda et al. |
| 6,828,533 B2 * | | 12/2004 | Hayami et al. ................ 219/730 |
| 2004/0232141 A1 | | 11/2004 | Yamasaki et al. |
| 2007/0215608 A1 * | | 9/2007 | Yoshino et al. ............... 219/681 |
| 2008/0121635 A1 * | | 5/2008 | Lee ................................ 219/681 |
| 2009/0206071 A1 | | 8/2009 | Mori et al. |
| 2010/0288756 A1 * | | 11/2010 | Uchiyama ..................... 219/756 |
| 2010/0301039 A1 * | | 12/2010 | Uchiyama et al. ............ 219/704 |

FOREIGN PATENT DOCUMENTS

| | | |
|---|---|---|
| JP | 51-064936 UM | 5/1976 |
| JP | 8-049854 A | 2/1996 |
| JP | 9-000173 A | 1/1997 |

(Continued)

OTHER PUBLICATIONS

International Search Report for PCT/JP2008/003749 dated Feb. 24, 2009.

*Primary Examiner* — Quoc Hoang
(74) *Attorney, Agent, or Firm* — Pearne & Gordon LLP

(57) ABSTRACT

A cooker of the invention includes: a heating chamber; a detachable heating pan; a high-frequency wave supply unit which generates microwaves; an antenna which radiates the microwaves generated by the high-frequency wave supply unit; a heat supply unit which heats an object placed on the heating pan by heat radiation; and a control unit which controls heating treatment of the objects to be heated. When a first object to be heated is placed on a placing table used also as a bottom surface of the heating chamber, and a second object to be heated is placed on the heating pan, the control unit controls the second object to be heated so as to be heated by the heat supply unit after subjecting at least the first object to be heated to the microwave radiation, and stops operation after heating of the objects to be heated is completed.

10 Claims, 23 Drawing Sheets

FOREIGN PATENT DOCUMENTS

| | | |
|---|---|---|
| JP | 11-159764 A | 6/1999 |
| JP | 2001-248840 A | 9/2001 |
| JP | 2004-071216 A | 3/2004 |
| JP | 2001-294050 A | 10/2004 |
| JP | 2006-097988 A | 4/2006 |
| JP | 2006-286443 A | 10/2006 |
| JP | 2007-333362 A | 12/2007 |
| JP | 2008-241062 A | 10/2008 |
| JP | 2008-281302 A | 11/2008 |

* cited by examiner

COOKER

TECHNICAL FIELD

The present invention relates to a cooker which dielectrically heats objects to be heated.

BACKGROUND ART

Since a microwave oven which is a typical microwave heating device can directly heat food which is an object to be heated, it has become an indispensable instrument of life due to simplicity of not needing to prepare a pan or an iron pot. Up until now, a microwave oven which is popular is one in which the size of a space which accommodates food in a heating chamber where microwaves are propagated has width dimension and depth dimension of about 300 to 400 mm and height dimension of about 200 mm.

In recent years, products are being put to practical use where a heating chamber has a shape in which the bottom surface of a space which accommodates food is flat, the width dimension is set to 400 mm or more so as to be comparatively larger than a depth dimension, and the breadth is large which increases convenience as a plurality of dishes can be arranged and heated.

Additionally, along with the multi-functionalization of microwave ovens, microwave ovens are being introduced into the market with a "grill function" in addition to the existing so-called "heating function" (high-frequency wave heating which heats food by radiates microwaves onto the food). The grill function includes a means for raising the temperature of a heating plate on which food is placed, thereby heating the food via the heating pan, a means for heating food by a heating heater, or a function which cooks food by a direct fire type (the cooking finish which cooks so that the inside is juicy while the outside is crispy) by a combination of these methods.

In the related art, as shown in a configuration diagram of a conventional high-frequency wave heating device of FIG. 27, this kind of high-frequency wave heating device 300 includes a waveguide 303 which transmits the microwaves radiated from a magnetron 302 which is a typical microwave generating means, a heating chamber 301, a placing table 306 which is fixed in the heating chamber 301 for placing food (not shown) which is a typical object to be heated and which has a property that microwaves can be easily transmitted therethrough since the placing table is made of a low-loss dielectric material such as ceramic or glass, an antenna space 310 formed below the placing table 306 in the heating chamber 301, a rotating antenna 305 which is attached to the vicinity of the center of the heating chamber 301 and spans from the waveguide 303 to the antenna space 310 in order to radiate the microwaves in the waveguide 303 into the heating chamber 301, a motor 304 serving as a typical driving means which can drive the rotation of the rotating antenna 305, a heating pan 308 which is installed in the heating chamber 301 depending on the applications, a pan-receiving portion 307 which supports the heating pan 308, and a heater 309 which performs electrical heating.

In the case of heating function where an object to be heated is directly heated and warmed through high-frequency wave heating, high-frequency wave heating treatment is executed with food and the like placed on the placing table 306. The microwaves radiated from the magnetron 302 are temporarily absorbed in the rotating antenna 305 through the waveguide 303, and then, the microwaves are radiated toward the heating chamber 301 from the upper surface of a radiating portion of the rotating antenna 305. At this time, usually, in order to uniformly agitate microwaves in the heating chamber 301, the rotating antenna 305 radiates microwaves while rotating at a constant speed.

Additionally, in the case of the grill function where a direct fire type cooking is performed, food (for example, meat, fish and the like) is placed on the heating pan 308 placed on the pan-receiving portion 307. In this state, a surface portion of food is heat-treated by a heater 309 which is located above the food. On the other hand, a rear surface portion of food is heat-treated by the heating pan 308 of which the temperature has been raised by microwaves.

In heating and cooking where microwaves are concentrated on the food, the moisture inside the food evaporates excessively due to the properties of microwaves. In contrast, in the process of heating food by a heater and a heating pan, the food can be finished with a so-called direct fire type of finishing so that the surface of food is crispy while the moisture or taste is enclosed inside the food (refer to Patent Document 1).

[Patent Document 1] JP-A-2004-071216

DISCLOSURE OF INVENTION

Technical Problem

In the conventional high-frequency wave heating device disclosed in Patent Document 1, it is assumed that, in the case of a warming function, the heating pan 308 is removed and the food, etc. placed on the placing table 306 is heat-treated by microwaves, and in the case of a grill function, the temperature of the heating pan 308 is raised by microwaves in a state where food, etc. is not placed on the placing table 306, and the rear surface portion of the food placed on the heating pan 308 is heat-treated. That is, the conventional high-frequency wave heating device is not one invented on the basis of the idea that heating treatment is performed with food, etc. placed on the placing table 306 and the heating pan 308, but one invented on the basis of the idea that heating treatment is performed with food, etc. placed on either the placing table 306 or the heating pan 308.

If it is intended to raise the temperature of the heating pan 308 by microwaves with food, etc. placed on the placing table 306, the microwaves radiated from below the placing table 306 will be absorbed and attenuated due to the food, etc. on the placing table 306, and thus the temperature of the heating pan 308 cannot be sufficiently raised unlike in a state where food, etc. is not placed on the placing table 306.

The invention was made in view of the above circumstances, and an object of the invention is to provide a cooker capable of carrying out the heating treatment suitable for a state where the objects to be heated are respectively placed on both the placing table used also as the bottom surface of the heating chamber, and the heating pan (hereinafter, the heating treatment which is performed in a state where objects to be heated are respectively placed on both a placing table used also as the bottom surface of a heating chamber, and a heating pan is referred to as above and below heating treatment).

Technical Solution

A cooker of the invention includes: a heating chamber in which an object to be heated is placed on a placing table used also as a bottom surface thereof; a detachable heating pan which is detachably provided inside the heating chamber and on which an object to be heated is placed which is different from the object to be heated; a high-frequency wave supply means which generates microwaves; an antenna which radiates the microwaves generated by the high-frequency wave supply means; a heat supply means which heats the object to be heated placed on the heating pan by heat radiation different from the microwave heating; and a control means which controls heating treatment of the objects to be heated. When a first object to be heated is placed on the placing table used also as the bottom surface of the heating chamber, and a second object to be heated is placed on the heating pan, the control means controls the second object to be heated so as to be heated by the heat supply means after subjecting at least the first object to be heated to the microwave radiation, and stops operation after heating of the objects to be heated is completed.

ADVANTAGEOUS EFFECTS

According to the cooker of the invention, even in a state where objects to be heated are respectively placed on both the placing table used also as the bottom surface of the heating chamber, and the heating pan, the heating treatment suitable for the state where the objects to be heated are placed can be carried out.

EXPLANATION OF REFERENCES

Figure 1:
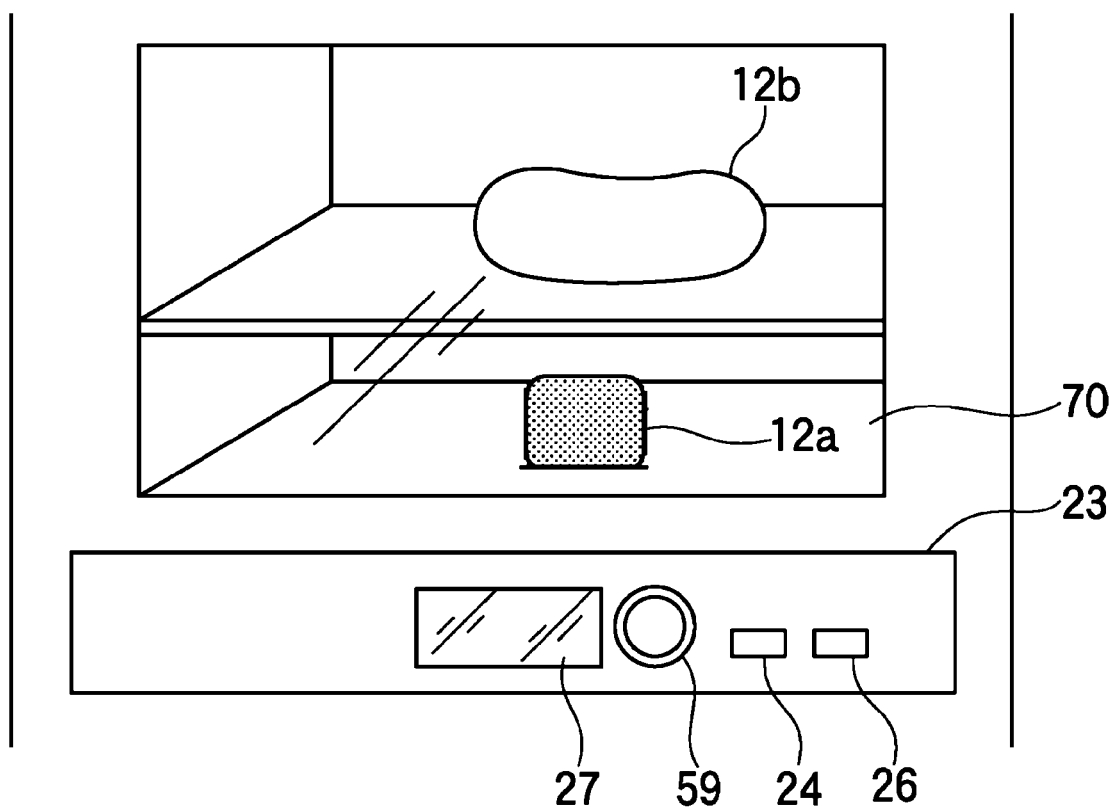
FIG. 1 shows a configuration example when a cooker of an embodiment of the invention is seen from a front part (a surface where a translucent window for visually recognizing the inside of a heating chamber is arranged).

11: HEATING CHAMBER
11a: PLACING TABLE USED ALSO AS BOTTOM SURFACE OF HEATING CHAMBER
12: FOOD
20: INFRARED RAY GENERATING MEANS
21: ARGON HEATER
30: HEATING PAN
40: HIGH-FREQUENCY WAVE GENERATING MEANS
41: MAGNETRON
42: WAVEGUIDE
43: ROTATING ANTENNA

BEST MODE FOR CARRYING OUT THE INVENTION

One aspect of a cooker of the invention includes: a heating chamber in which an object to be heated is placed on a placing table used also as a bottom surface thereof; a detachable heating pan which is detachably provided inside the heating chamber and on which an object to be heated is placed which is different from the object to be heated; a high-frequency wave supply means which generates microwaves; an antenna which radiates the microwaves generated by the high-frequency wave supply means; a heat supply means which heats the object to be heated placed on the heating pan by heat radiation different from the microwave heating; and a control means which controls heating treatment of the objects to be heated. When a first object to be heated is placed on the placing table used also as the bottom surface of the heating chamber, and a second object to be heated is placed on the heating pan, the control means controls the second object to be heated so as to be heated by the heat supply means after subjecting at least the first object to be heated to the microwave radiation, and stops operation after heating of the objects to be heated is completed.

Through this configuration, even in a state where objects to be heated are respectively placed on both the placing table used also as the bottom surface of the heating chamber, and the heating pan, the heating treatment suitable for the state where the objects to be heated are placed can be carried out.

One aspect of the cooker of the invention includes a steam supply means which heats the object to be heated by steam, and the control means controls to heat the first object to be heated or the second object to be heated by the steam supply means.

Through this configuration, since an object to be heated can be heated by the heat radiation from various heat sources while maintaining a state where moisture is given to the surface of the object to be heated, the surface of the object to be heated can be prevented from being excessively burnt while promoting the rise in temperature inside the object to be heated. When steam becomes superheated steam, it is possible to perform cooking in which the surface is baked so as to be crisp, while it is difficult for the moisture inside the object to be heated to escape, and the inside is juicy.

One aspect of the cooker of the invention includes that the control means performs a control to drive the steam supply means so as to add heating by steam at a predetermined time after the second object to be heated begins to be heated by the heat supply means.

Through this configuration, the surface of the object to be heated is encompassed with the superheated steam. As a result, the surface of the object to be heated can be prevented from being excessively burnt while promoting the rise in temperature inside the object to be heated. It is also possible to perform cooking in which the surface is baked so as to be crisp, while it is difficult for the moisture inside the object to be heated to escape, and the inside is juicy.

One aspect of the cooker of the invention includes that the control means performs a control to drive the steam supply means so as to supply steam temporarily, during the heating of the second object to be heated by the heat supply means.

Through this configuration, the surface of the object to be heated is encompassed with the superheated steam. As a result, the surface of the object to be heated can be prevented from being excessively burnt while promoting the rise in temperature inside the object to be heated. It is also possible to perform cooking in which the surface is baked so as to be crisp, it is difficult for the moisture inside the object to be heated to escape, and the inside is juicy.

One aspect of the cooker of the invention includes that the control means performs a control to lower the output of microwaves before the second object to be heated begins to be heated by the heat supply means so as to continue microwave heating, and to drive the steam supply means to add heating by steam while the output of microwaves is lowered.

Through this configuration, an object to be heated can be heated by the heat radiation from various heat sources while maintaining a state where moisture is given to the surface of the object to be heated, and it is possible to promote the rise in temperature to the inside of the object to be heated, and perform cooking so as to be finished to a soft and smooth texture.

One aspect of the cooker of the invention includes that the control means performs a control to drive the steam supply means to add heating by steam after the stop of the heating by the heat supply means, and to complete the heating of the object to be heated and stop operation.

Through this configuration, an object to be heated can be heated by the heat radiation from various heat sources in a state where the surface of the object to be heated is encompassed with the superheated steam. Thus, the surface of the object to be heated can be prevented from being excessively burnt while promoting the rise in temperature inside the object to be heated. It is also possible to perform cooking in which the surface is baked so as to be crisp, while it is difficult for the moisture inside the object to be heated to escape, and the inside is juicy.

One aspect of the cooker of the invention includes a notification means, and the control means performs a control to stop the microwaves from the high-frequency wave supply means temporarily, and to drive the notification means at the stop.

Through this configuration, a user can be notified of an event that the heating by microwaves is temporarily stopped, and the first object to be heated can be taken out in time in an optimal finished state.

One aspect of the cooker of the invention includes a hot-air supply means which supplies a hot blast to the heating chamber, and the control means performs a control to drive the heat supply means and the hot-air supply means alternately so as to add heating after microwaves are radiated.

Through this configuration, without burning an object to be heated with large weight and volume, the whole surface can be heated and browned, and also the inside can be effectively heated. Moreover, additional heating of the first object to be heated can also be performed.

One aspect of the cooker of the invention includes that the heat supply means includes an optical heater, and the control means performs a control so that the second object to be heated is heated by the optical heater.

Through this configuration, an object to be heated placed on the heating pan can be more quickly and uniformly heated and browned.

One aspect of the cooker of the invention includes that the optical heater is a steam transmissive heater.

Through this configuration, when the light (particularly infrared light) which can be transmitted through the steam is directly radiated to the surface of an object to be heated, the surface of the object to be heated placed on the heating pan can be finished so as to be crisp, irrespective of the amount of steam in the heating chamber.

Hereinafter, embodiments of the invention will be described with reference to the drawings. In addition, the invention is not limited by the embodiments which will be described below.

First, an example of the appearance of the cooker of the embodiment of the invention will be described. FIG. 1 shows a configuration example when a cooker of an embodiment of the invention is seen from a front surface (a surface where a transparent window 70 for visually recognizing the inside of a heating chamber is provided). The transparent window 70 for visually recognizing the inside of the heating chamber 11, and an operation panel 23 are provided on the front surface of a cooker 100. The operation panel 23 is provided with a start switch 26 which instructs the start of heating, a cancelling switch 24 which instructs the end of heating, a display unit 27, and a dial 59 for selecting a cooking program prepared in advance or performing a manual operation. In this way, the operation panel 23 is provided at a position which is easy to visually recognize the inside of the heating chamber 11, so that the switch or the dial can be easily operated while confirming the inside of the heating chamber 11 and the display content of the display unit 27.

Figure 2:
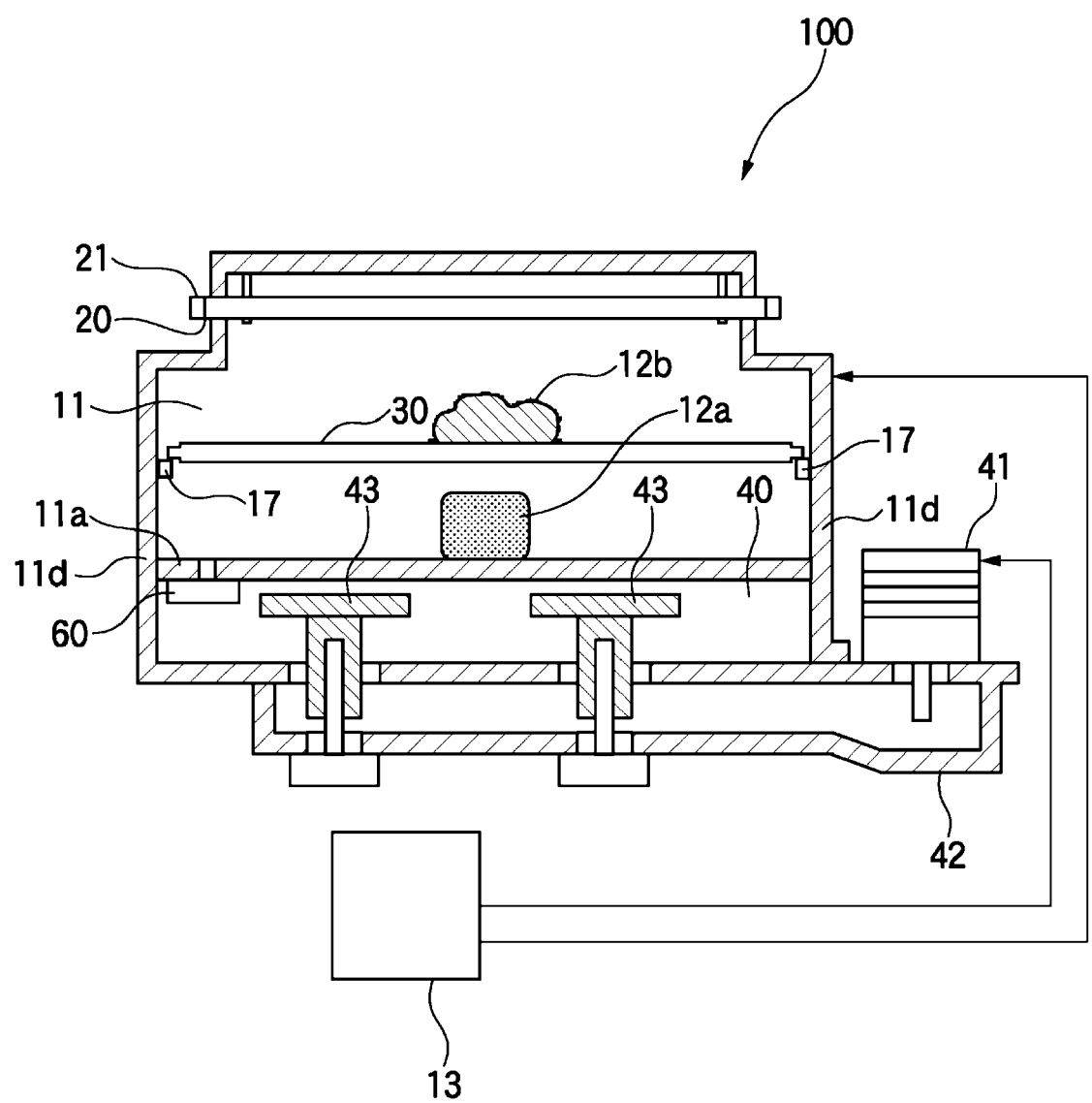
FIG. 2 is a sectional view when the cooker of the embodiment of the invention is cut across right and left (right and left directions toward the front part of the cooker).
Figure 4:
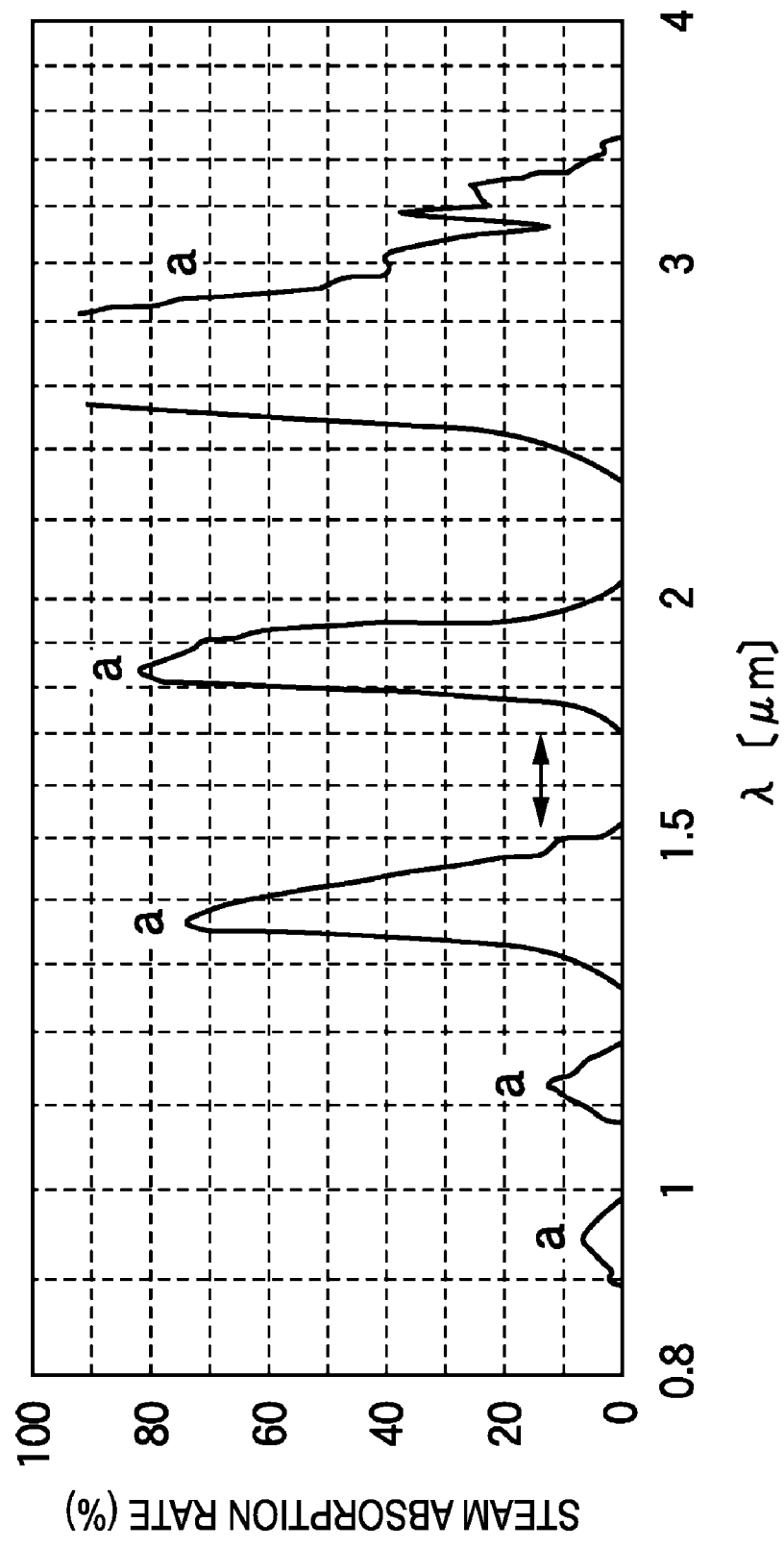
FIG. 4 is a graph showing a ratio in which steam absorbs light to the wavelength of light.
Figure 5:
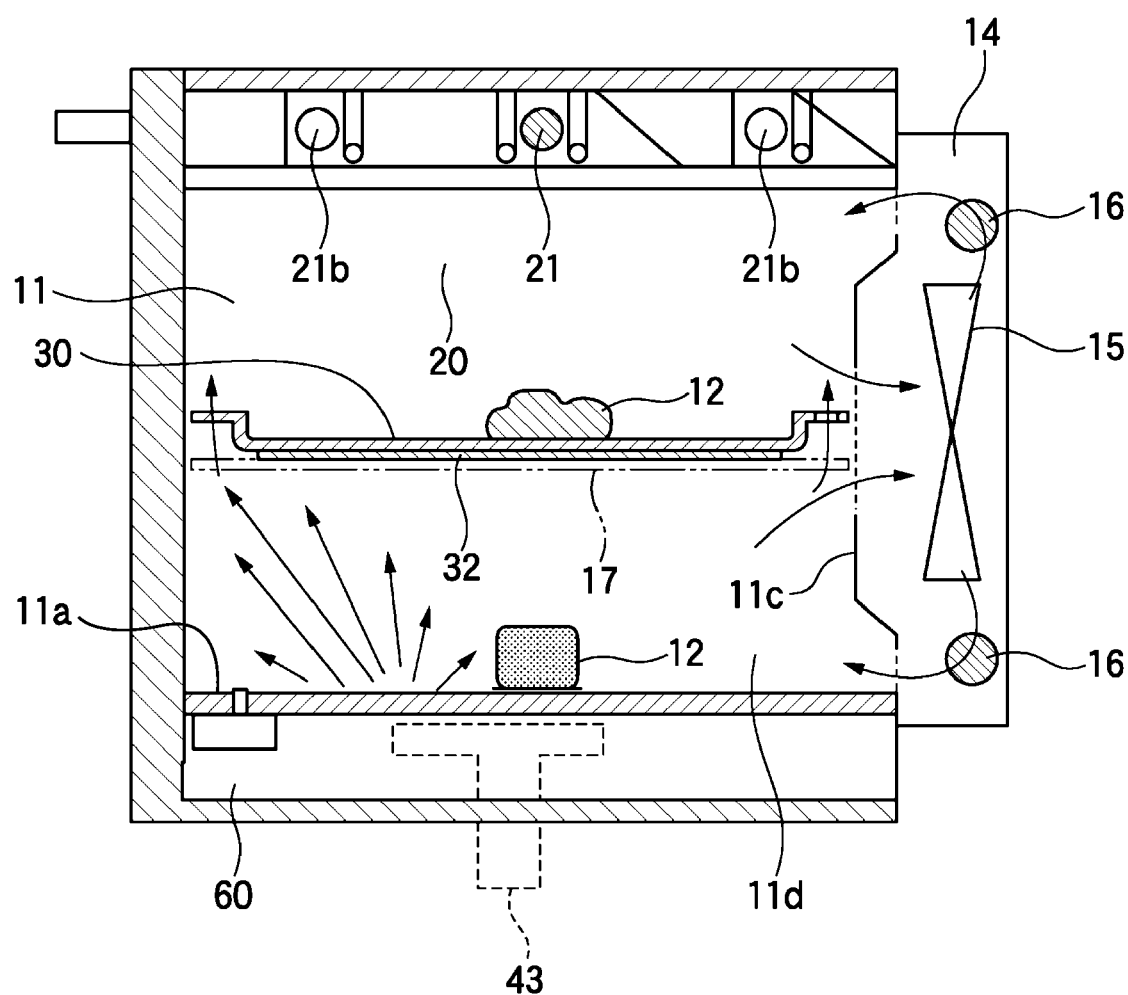
FIG. 5 is a sectional view when the cooker of the embodiment of the invention is cut across front and back (a direction toward the deep side of the heating chamber from the front part of the cooker).

Next, an example of the internal structure of the cooker of the embodiment of the invention will be described. FIG. 2 shows a sectional view when the cooker of the embodiment of the invention is cut from the right to left (right and left directions toward the front part of the cooker), FIG. 3 shows a sectional view when a top plate of a top surface of the cooker of the embodiment of the invention is cut in the direction of the top surface, FIG. 4 shows a graph showing a ratio in which steam absorbs light with regard to the wavelength of light, and FIG. 5 is sectional view when the cooker of the embodiment of the invention is cut from front to back (a direction toward the deep side of the heating chamber from the front part of the cooker).

Figure 3:
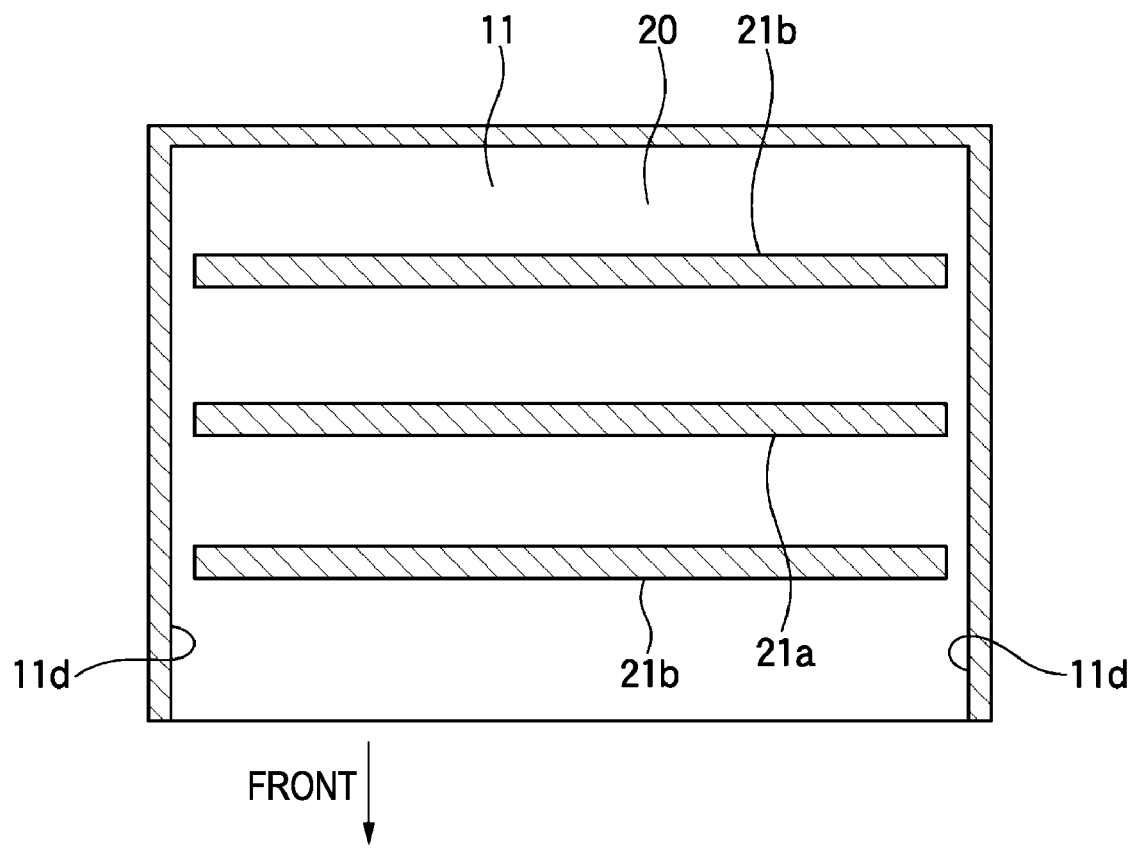
FIG. 3 is a sectional view when a top plate of a top surface of the cooker of the embodiment of the invention is cut in the direction of the top surface.

As shown in FIGS. 2 and 3, the cooker 100 of the embodiment of the invention includes the heating chamber 11, an infrared rays generating means 20 which generate infrared rays which easily transmit through steam, a heating pan 30 which is supported by a locking portions 17 to partition the heating chamber 11 vertically, a high-frequency wave generating means 40 which supplies high frequency waves from below a placing table 11a used also as the bottom surface of the heating chamber 11 on which the food which is an object 12a to be heated is placed, and a steam generating means 60 which generate steam in the heating chamber 11. In addition, in the present embodiment, although the steam generating means 60 is provided in the heating chamber 11, the steam generated out of the heating chamber 11 may be supplied into the heating chamber 11.

Since the steam is supplied continuously by the steam generating means 60 and circulated through the heating chamber, the steam density of a region which touches the object 12a to be heated does not necessarily become zero, and the surface of the object 12a to be heated can be prevented from being excessively burnt. Additionally, since the steam also circulates through an upper space of the spaces partitioned by the heating pan 30 (this circulation of the steam is realized by the structure of the heating pan 30. The structure of the heating pan 30 will be described later), the rise in temperature inside an object 12b to be heated placed on the heating pan 30 is promoted so that the object to be heated can be prevented from being excessively burnt, without leaving a raw portion in the middle thereof. Additionally, since moderate humidity is applied to the surface, the surface of the object 12b to be heated is wrapped with the steam, and it is difficult for the moisture inside the object 12b to escape. As a result, it is possible to perform cooking in which the surface is baked so as to be crisp, and the inside is juicy.

The cooker 100 is a microwave oven using a method of rotating two antennas, includes a high-frequency wave generating means 40 which supplies high frequency waves from below the placing table 11a used also as a bottom surface of the heating chamber 11 on which the food which is the object 12a to be heated is placed, and is an example in which a magnetron 41 which is the high-frequency wave generating means 40 is provided on the right. A waveguide 42 which guides the high frequency waves generated from the magnetron 41 into the heating chamber 11, and rotating antennas 43 which radiate radio waves to the heating chamber 11 are provided. The rotating antennas 43 are configured to have radiation directivity. The cooker 100 of the present embodiment is configured to control at least the portion of the rotating antenna 43 which has high radiation directivity in a predetermined orientation, thereby further concentrating and radiating microwaves in a specific direction. An arrow which extends in the direction of the top surface from the placing table 11a used also as the bottom surface of the heating chamber 11 shown in FIG. 5 represents the microwaves radiated from the rotating antennas 43, and the direction of the arrow shows a direction in which microwaves are radiated, and the length of the arrow shows the strength of the microwaves. FIG. 5 shows a case where microwaves are strongly radiated in the vicinity of a peripheral portion of the heating pan. How the heating pan is concretely controlled will be described later.

Additionally, as shown in FIG. 5, a communication passage 14, a circulation fan 15, and a heater 16 are provided behind a partition plate 11c on the deep side of the heating chamber 11, the air in the heating chamber 11 is sucked by the circulation fan 15 and heated by the heater 16 (an arrow heading for the circulation fan 15 from the heating chamber 11 in FIG. 5 indicates the flow of the air), and the air heated from a discharge hole provided in the partition plate 11c is able to be sent into the heating chamber 11 (an arrow heading for the heating chamber 11 from the heater 16 in FIG. 5 indicates the flow of the air).

Additionally, as shown in FIGS. 2 and 5, an upper portion of the heating chamber 11 is provided with a plurality of pipe heaters 21 (optical heaters) (as shown in FIG. 3, a total of three are provided including an argon heater 21a which is provided in the middle of a top surface 11b and which can effectively perform a radiation heating to an object to be heated through the steam, and Milacron heaters 21b which are provided on both the front and rear sides of the argon heater 21a and which can brown the surface of the objected to be heated by radiating a relatively large amount of far-infrared ray) which generate infrared rays as the infrared ray generating means 20. The respective pipe heaters 21 and the magnetron 41 are controlled by a control unit, and the pipe heaters 21 cooks the object to be heated by radiating infrared rays with a wavelength which is hardly absorbed by steam such that the infrared rays transmit through the steam which exists in the heating chamber 11 and arrive at the object 12b to be heated (the object 12a to be heated when there is no heating pan 30) and cooks the object to be heated by radiating a relatively large amount of far-infrared ray so as to brown the surface of the object to be heated. In addition, when the argon heater 21a and the Milacron heaters 21b are called by generic names, they will be mentioned as the pipe heaters 21.

The pipe heaters 21 which generate a plurality of wavelengths, as shown in FIG. 4, are configured to generate as a peak any one wavelength among 1.5 μm or more and less than 1.7 μm, 2.0 μm or more and less than 2.3 μm, and 3.4 μm or more and less than 4.5 μm which are wavelengths of a region where the steam absorption rate is low.

Thereby, infrared rays having as a peak any one wavelength among 1.5 μm or more and less than 1.7 μm, 2.0 μm or more and less than 2.3 μm, and 3.4 μm or more and less than 4.5 μm which are wavelengths of a region where the steam absorption rate is low are radiated into the heating chamber 11 from the pipe heaters 21 including three different kinds of heaters, and the infrared rays are not absorbed in the steam but are transmitted through steam to radiate and heat the food which are the objects 12a and 12b to be heated.

As a result, the object 12b (12a) to be heated placed on the heating chamber 11 can be quickly and uniformly heated. Additionally, when infrared rays are directly radiated on the surface of the object 12b (12a) to be heated, the surface of the object 12b (12a) to be heated can be finished so as to be crisp, and also quickly browned. Moreover, when the steam circulates and is supplied continuously, the steam density of a region which is in contact with the object 12a or 12b to be heated does not become zero, and the surface of the object 12a or 12b to be heated can be prevented from being excessively burnt while the rise in temperature inside the object is promoted. Additionally, since the surface of the object 12b (12a) to be heated is wrapped with the steam, it is possible to perform cooking in which it is difficult for the moisture inside the object 12b (12a) to escape, the surface of the object is baked so as to be crisp, and the inside is juicy. On the other hand, when the amount of steam is lowered in the heating chamber with the progress of the heating, the far infrared rays are directly radiated on the surface of the object 12b (12a) to be heated, which can quickly brown the surface of the object 12b (12a) to be heated.

As shown in FIG. 5, since the pipe heaters 21 are provided in the top surface 11b of the heating chamber 11, the argon heater 21a is provided in the middle of the top surface 11b, and the Milacron heaters 21b are provided on both of the front and rear sides of the argon heater 21a, the infrared rays with a desired wavelength as mentioned above are generated. The core wire of the argon heater 21a is a tungsten wire, and argon gas is enclosed with a transparent pipe member 22. The argon heater 21a has the feature that operation start-up is fast compared to the Milacron heaters 21b.

Although the Milacron heaters 21b have conventionally been used, since the wavelengths thereof is longer than the argon heater 21a, and the start-up is faster as compared to a mica heater and the like, the heaters are suitable for browning the surface of the objects 12a and 12b to be heated. Additionally, there is a feature that the cost is low.

Here, when the Milacron heaters 21b is loaded on a microwave oven, there is a possibility that the Milacron heaters 21b absorb microwaves and generate heat, and a glass material which is being used is melted. Thus, it is desirable to adopt the Milacron heaters 21b of a white tube which have a relatively low dielectric constant and hardly absorb microwaves.

Additionally, in the heating chamber 11, as shown in FIGS. 2 and 5, locking portions 17 are provided in mutually facing rising walls 11d and 11d in the heating chamber 11. The heating pan 30 is supported by the locking portions 17 to partition the heating chamber 11 vertically and is able to place the object 12b to be heated thereon. In addition, the lower space partitioned by the heating pan 30 may be referred to a first space, and the upper space may be referred to as a second space.

Figure 6:
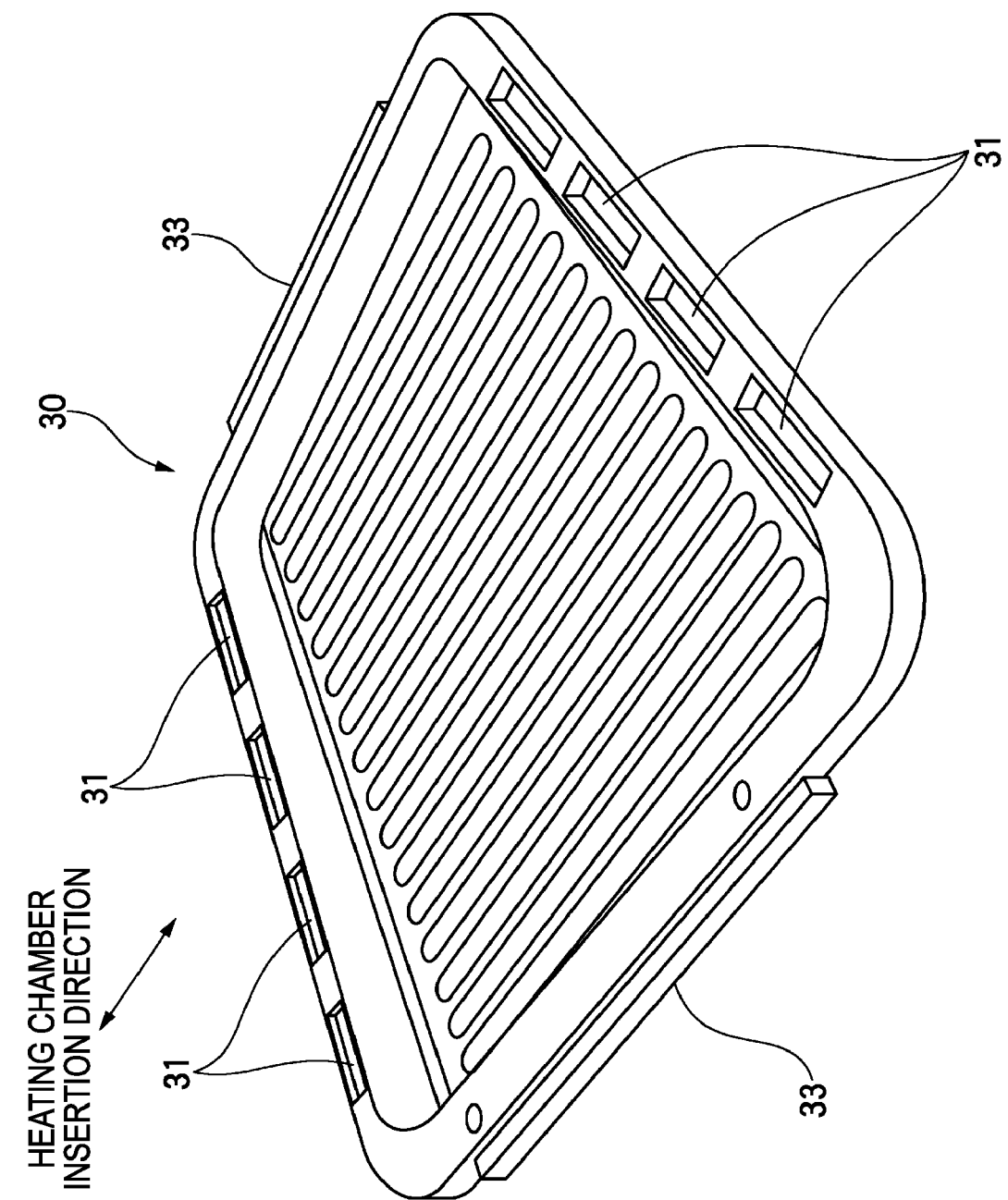
FIG. 6 is a configuration diagram of a heating pan in the cooker of the embodiment of the invention.

As shown in the configuration diagram of the heating pan in the cooker of the embodiment of the invention of FIG. 6, the heating pan 30 has resin handles 33 provided on both of the right and left sides of the heating pan 30 having a rectangular plate shape as a whole, and is able to enter or exit in the front and back directions along the locking portions 17 of the heating chamber 11. Additionally, the peripheral portion of the heating pan 30 is provided with communication holes 31 which communicate with the heating chamber 11 vertically. Thereby, the steam is generated in a lower portion of the heating chamber 11 partitioned by the heating pan 30, and the generated steam is guided to an upper portion through the communication holes 31 provided at the peripheral portion of the heating pan 30, thereby cooking the object 12b to be heated placed on the heating pan 30. FIG. 5 shows the arrow heading for the upper space partitioned by the heating pan 30 through the peripheral portion of the heating pan 30 from the lower space partitioned by the heating pan 30. This arrow indicates the flow of the steam heading for the upper space.

Additionally, some of the microwaves radiated to the first space of the heating chamber 11 pass through the peripheral portion of the heating pan 30, and propagate to the second space. There are places on the heating pan 30 other than the resin handles 33 which touch the locking portions 17 do not touch the wall surface of the heating chamber 11, and microwaves easily propagate to the second space from these places. Additionally, the communication holes 31 provided in the heating pan 30 also promote the propagation of microwaves from the first space to the second space. As a result, the object 12b to be heated placed on the heating pan 30 is heated by the microwaves which have propagated to the second space.

Especially, as shown in FIG. 5, when the direction of the microwaves of the rotating antennas 43 which have high radiation directivity face the peripheral portion of the heating pan 30, the microwaves radiated from the rotating antennas 43 also propagate to the second space in a state where the damping thereof is limited to a minimum. As a result, the object 12b to be heated placed on the heating pan 30 can be efficiently heated.

Additionally, it is desirable that, for example, a radio-wave absorbing heating element 32, such as ferrite rubber, which absorbs the high frequency generated by the high-frequency wave generating means 40 to generate heat, is provided on the placing table used also as the bottom surface of the heating pan 30. Thereby, the object 12b to be heated placed on the heating pan 30 is heated from below, so that the object 12b to be heated can be cooked from both upper and lower surfaces. In addition, the lower surface of the heating pan 30 which touches the radio-wave absorbing heating element 32 is made to be unpainted, so that the heat conductivity can improve and the cooking time can be shortened. Moreover, if the direction of the microwaves of the rotating antennas 43 which have high radiation directivity face the heating pan 30, the temperature of the heating pan 30 can be efficiently raised.

Figure 7:
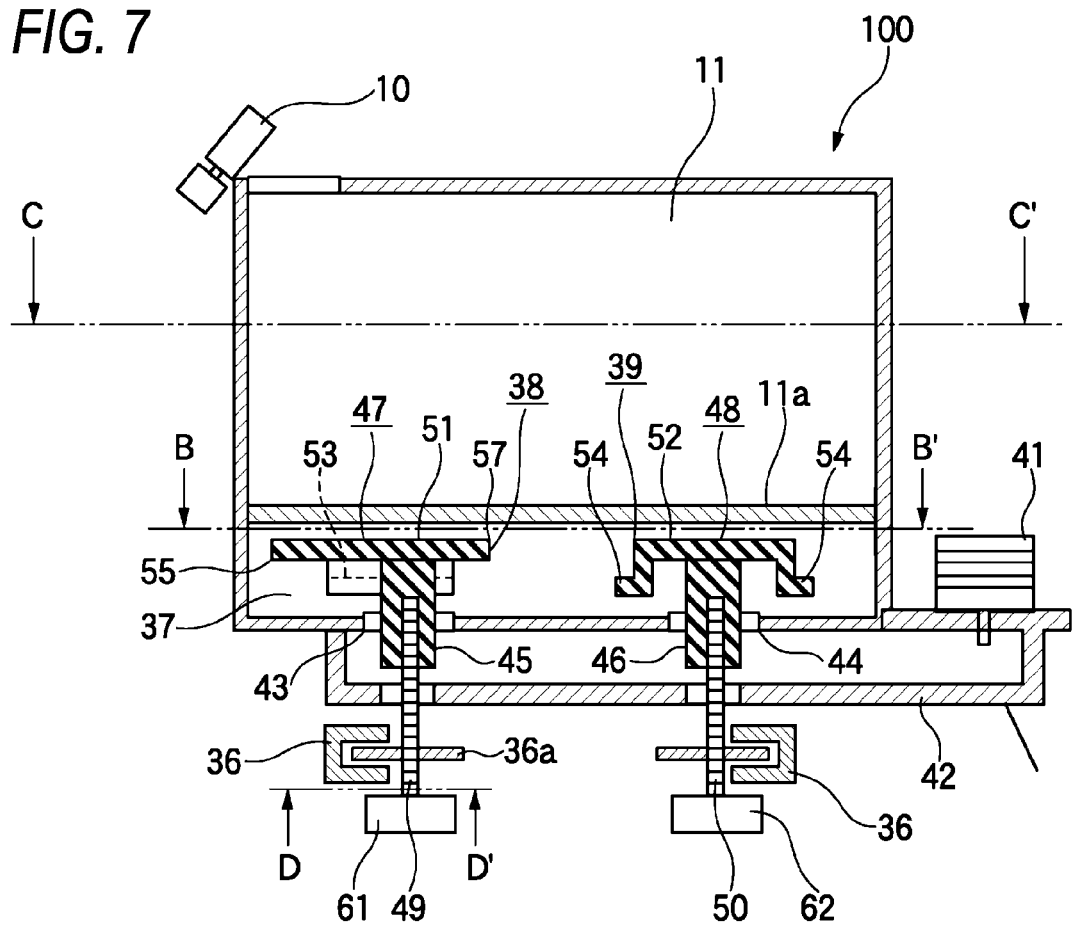
FIG. 7 is a detailed configuration diagram (a sectional view seen from the front) in the vicinity of a rotating antenna in the cooker of the embodiment of the invention.
Figure 8:
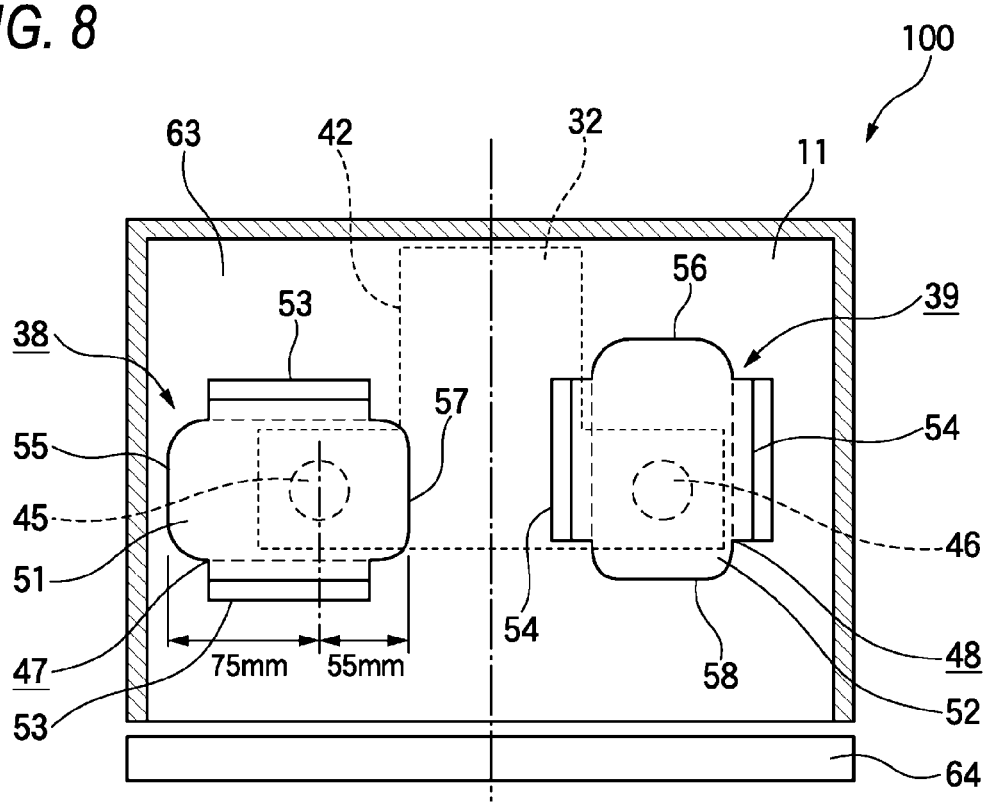
FIG. 8 is a sectional view of the cooker in B-B' of FIG. 7.

Then, a concrete configuration of the rotating antennas and a method of controlling the rotating antennas will be described. FIG. 7 is a detailed configuration diagram (a sectional view seen from the front) in the vicinity of rotating antennas in the cooker of the embodiment of the invention, and FIG. 8 is a sectional view of the cooker in B-B' of FIG. 7.

As shown in FIG. 7, the cooker 100 includes the waveguide 42 which transmits the microwaves radiated from the magnetron 41 which is a typical microwave generating means, the heating chamber 11 which is connected to an upper portion of the waveguide 42 and has a shape where a width dimension (about 410 mm) is greater than a depth dimension (about 315 mm), the placing table 11a which is fixed in the heating chamber 11 for placing the food (not shown) which is a typical object to be heated and has a property that microwaves can be easily transmitted therethrough since the placing table is made of a low-loss dielectric material such as ceramic or glass, an antenna space 37 formed below the placing table 11a in the heating chamber 11, two rotating antennas 38 and 39 which are attached to the positions symmetrical with respect to the width direction of the heating chamber 11 from the waveguide 42 to the antenna space 37 in order to radiate the microwaves in the waveguide 42 into the heating chamber 11, motors 61 and 62 serving as typical driving means which can rotationally drive the rotating antennas 38 and 39, a control unit 160 (shown in FIG. 17 which will be described later) which controls the motors 61 and 62 to control the orientation of the rotating antennas 38 and 39, a photo-interrupter 36 which constitutes an origin detection mechanism which detects the origin of rotation of each of the rotating antennas 38 and 39, and an infrared sensor 10 which is a temperature-distribution detecting means which detects the temperature distribution in the heating chamber 11.

Additionally, the rotating antennas 38 and 39 includes coupling portions 45 and 46 which pass through substantially circular coupling holes 43 and 44 with a diameter of about 30 mm which are provided at a boundary surface between the waveguide 42 and the heating chamber placing table used also as the bottom surface of the heating chamber, and which are made of a substantially cylindrical conductive material with a diameter of about 18 mm, and radiating portions 47 and 48 which are electrically connected to and integrated into the upper ends of the coupling portions 45 and 46 by calking, welding and the like and which are made of a conductive material which has a wider area in the horizontal direction than in the vertical direction.

Additionally, the rotating antennas 38 and 39 are configured to fit to shafts 49 and 50 of the motors 61 and 62 so that the centers of the coupling holes 43 and 44 become the centers of rotational driving. Since the radiating portions 47 and 48 do not have constant shape in the direction of rotation thereof, the radiating portions are configured to have radiation directivity.

The centers of rotation of the rotating antennas 38 and 39 are arranged at a substantially equal distance from the center in the heating chamber 11. Through this configuration, it is possible to heat, generally, the vicinity of the center in the heating chamber which is hardly heated with a configuration wherein an antenna is one by facing the portions of the rotating antennas 38 and 39 which have high radiation directivity toward the vicinity of the center.

The radiating portions 47 and 48 have the same shape, and radiating portion upper surfaces 51 and 52 have R in a substantially quadrilateral shape. Among four sides, facing two sides have radiating portion bending portions 53 and 54 bent at the placing table used also as the bottom surface of the heating chamber side, thereby limiting radiation of microwaves to the outside of the two sides. The distance between the placing table used also as the bottom surface of the heating chamber and the radiating portion upper surfaces 51 and 52 is set to about 10 mm, and the radiating portion bending portions 53 and 54 are lowered to positions lower than the upper surfaces by about 5 mm.

The remaining two sides have different horizontal lengths from the coupling portions 45 and 46 to ends, and constitute ends 55 and 56 whose length from the center of the coupling portions are about 75 mm, and ends 57 and 58 whose length from the center of the coupling portions are about 55 mm. Additionally, the dimension of the ends in the width direction is set to 80 mm or more. In this configuration, the rotating antennas 38 and 39 can increase the radiation directivity in the direction of ends 57 and 58 from the coupling portions 45 and 46.

Figure 9:
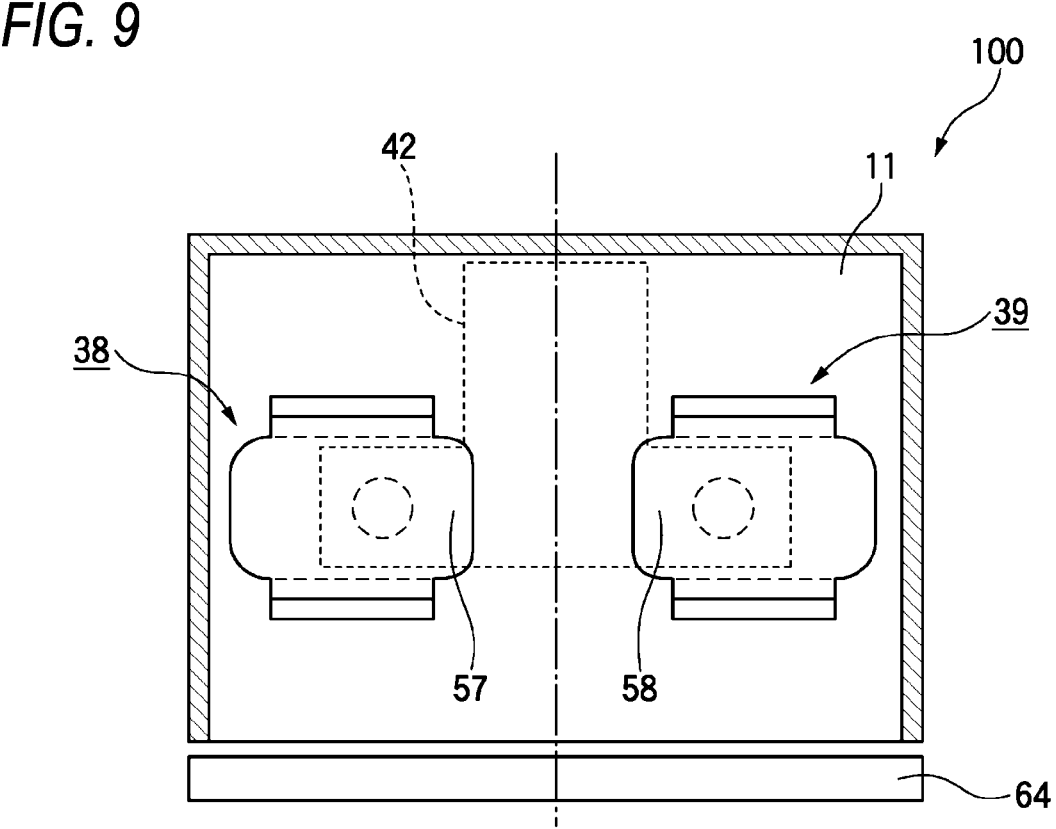
FIG. 9 shows an example of the orientation of the rotating antenna in the cooker of the embodiment of the invention.

In this configuration, when common food is uniformly heated, it is not particularly necessary to place the food to a storage location similarly to the conventional microwave oven, and the rotating antennas 38 and 39 may be constantly rotated as similarly to the conventional one. On the other hand, when intensive heating is made, for example, when the vicinity of the center in the heating chamber 11 is heated, as shown in an example of the orientation of the rotating antennas by the cooker of the embodiment of the invention of FIG. 9, the control unit 160 controls the ends 57 and 58 of the rotating antennas 38 and 39 to face a predetermined orientation called substantially the center of the heating chamber 11 in the width direction and substantially the center of the heating chamber in the depth direction.

When the ends 57 and 58 of the rotating antennas 38 and 39 face substantially the center of the heating chamber 11 in the width direction and substantially the center of the heating chamber in the depth direction, the radiation directivity in the direction of the ends 57 and 58 is high. Thus, microwaves can be radiated particularly from the direction of the ends 57 and 58, and the food located in the direction can be intensively heated.

Figure 10:
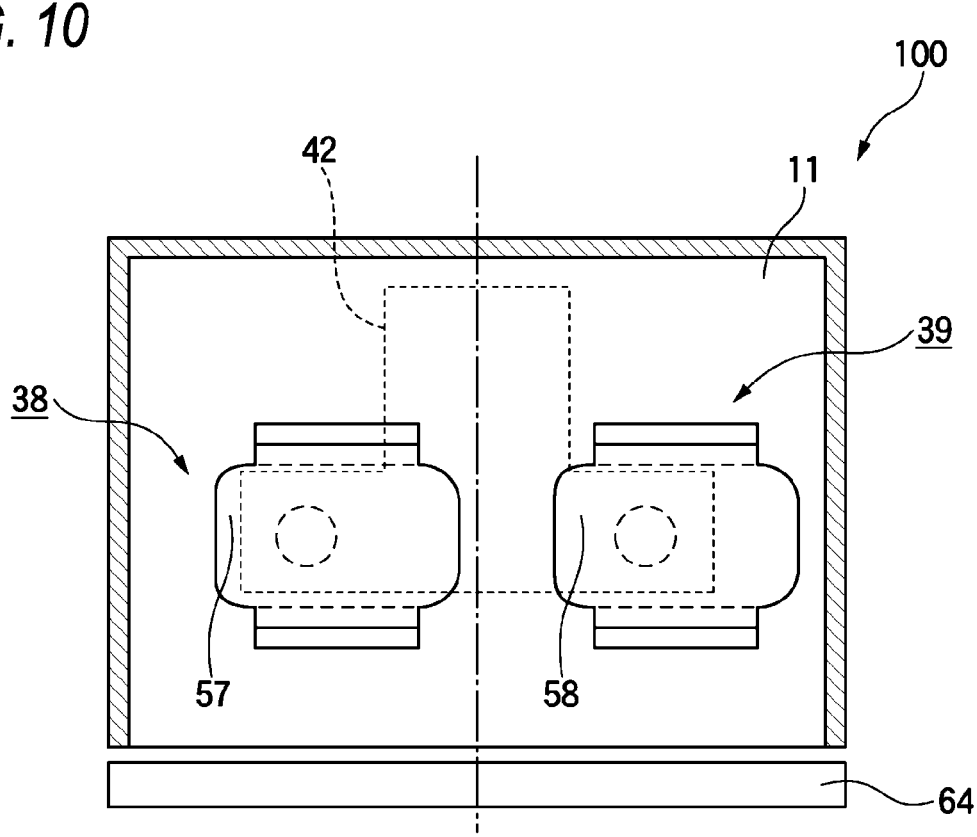
FIG. 10 shows an example of the orientation of the rotating antenna in the cooker of the embodiment of the invention.

Additionally, when the vicinity of the left in the heating chamber 11 is heated, as shown in an example of the orientation of the rotating antennas by the cooker of the embodiment of the invention of FIG. 10, the control unit 160 controls the ends 57 and 58 of the rotating antennas 38 and 39 to face the left (the left when the heating chamber 11 is seen from the door 64).

Figure 11:
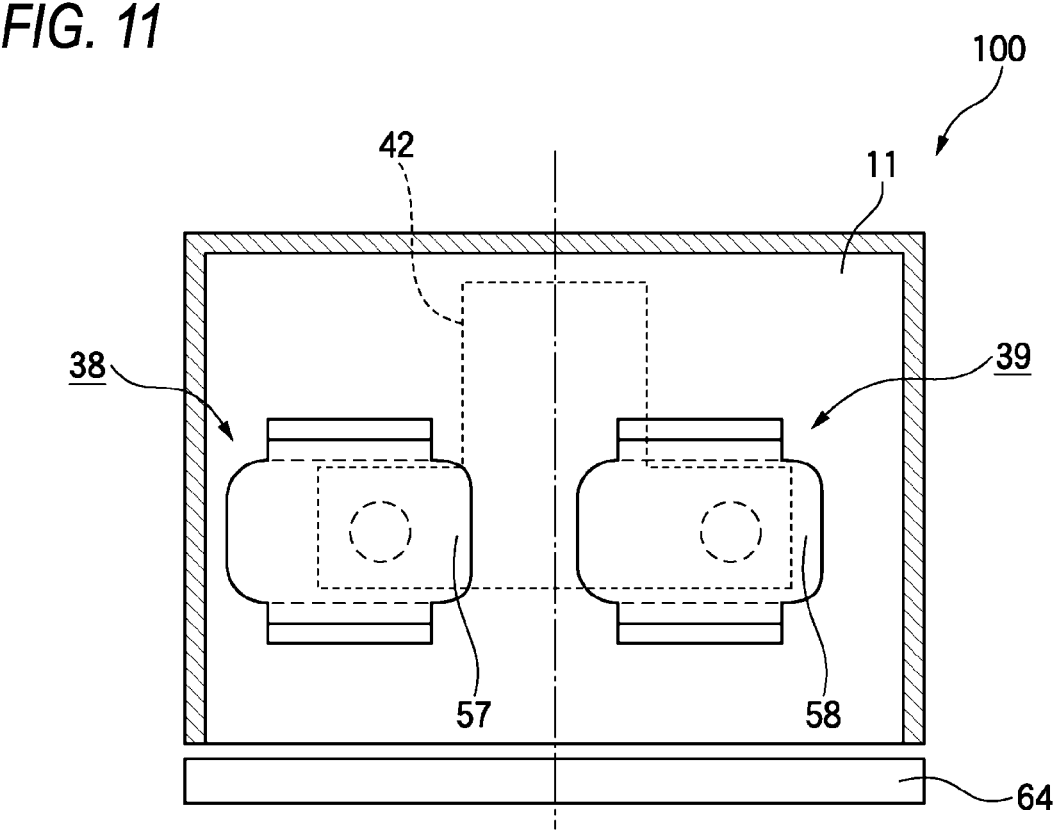
FIG. 11 shows an example of the orientation of the rotating antenna in the cooker of the embodiment of the invention.

Similarly, when the vicinity of the right in the heating chamber 11 is heated, as shown in an example of the orientation of the rotating antennas by the cooker of the embodiment of the invention of FIG. 11, the control unit 160 controls to face the ends 57 and 58 of the rotating antennas 38 and 39 to the right (the right when the heating chamber 11 is seen from the door 64).

Figure 12:
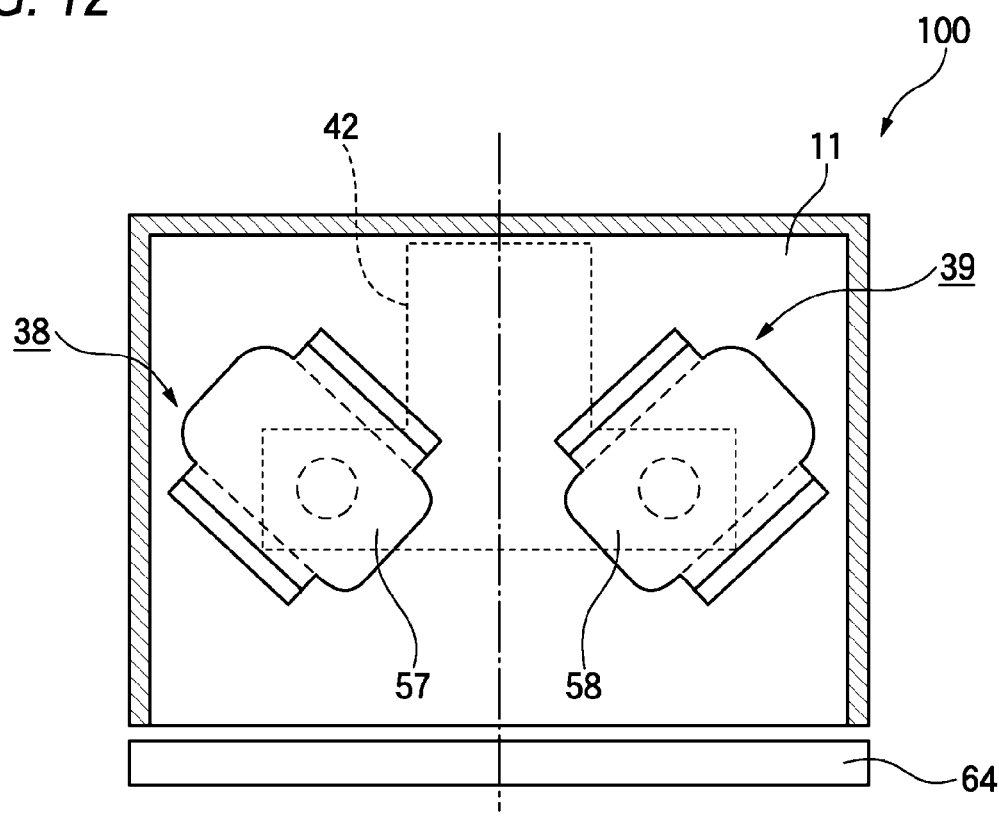
FIG. 12 shows an example of the orientation of the rotating antenna in the cooker of the embodiment of the invention.

Additionally, when the vicinity in front of the center in the heating chamber 11 is heated, as shown in an example of the orientation of the rotating antennas by the cooker of the embodiment of the invention of FIG. 12, the control unit 160 controls the ends 57 and 58 of the rotating antennas 38 and 39 to face substantially the center of the heating chamber 11 in the width direction and substantially the front of the heating chamber in the depth direction (the vicinity in front of the center in the heating chamber 11).

Figure 13:
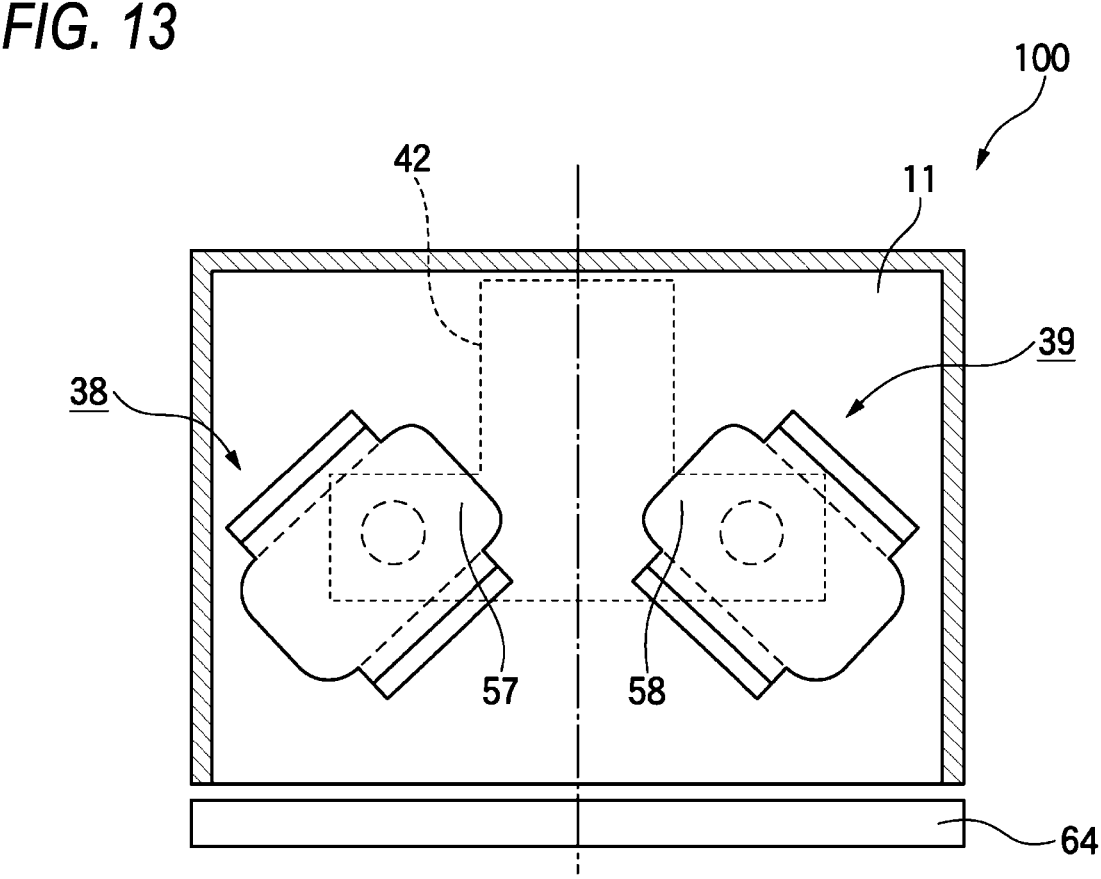
FIG. 13 shows an example of the orientation of the rotating antenna in the cooker of the embodiment of the invention.

Additionally, when the vicinity behind the center in the heating chamber 11 is heated, as shown in an example of the orientation of the rotating antennas by the cooker of the embodiment of the invention of FIG. 13, the control unit 160 controls the ends 57 and 58 of the rotating antennas 38 and 39 to face substantially the center of the heating chamber 11 in the width direction and substantially the rear of the heating chamber in the depth direction (the vicinity behind the center in the heating chamber 11).

As described above, the cooker 100 of the present embodiment controls the orientation of the rotating antennas according to locations intended to locally be heated. In order to face the rotating antennas 38 and 39 to a predetermined direction, using stepping motors as the motors 61 and 62, or means can be considered such as detecting a reference position to control energization time even in constant-rotation motors.

Figure 14:
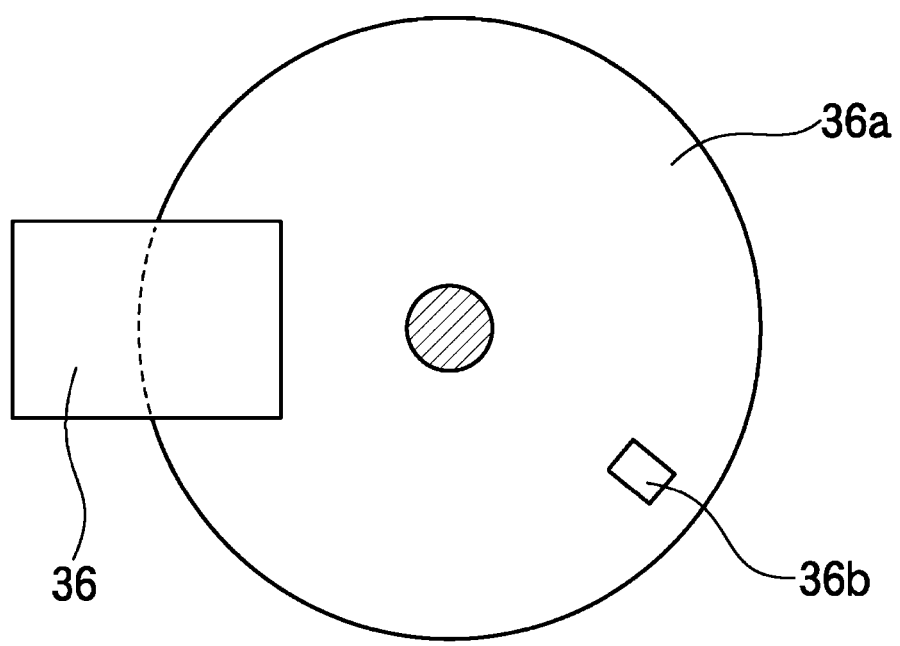
FIG. 14 is a sectional view of the cooker in D-D' of FIG. 7.

In the cooker of the present embodiment, the stepping motors are used as the motors 61 and 62, and the origin detection mechanisms are provided in shafts 49 and 50 of the respective motors, respectively. FIG. 14 shows a sectional view of the cooker in D-D' of FIG. 7. The origin detection mechanisms, as shown in FIG. 14, are constituted by a disk 36a which has a shaft as a central shaft, and a photo-interrupter 36. The disk 36a is provided with a rectangular slit 36b.

The disk 36a is commonly attached to the shafts 49 and 50 of the motor which rotate the rotating antennas 38 and 39, respectively, and rotates so as to block the optical path of the photo-interrupter 36 including a light-emitting element and a light-receiving element.

Through this configuration, there is nothing that blocks the optical path when the slit 36b passes through the optical path of a photo-interrupter 36. Thus, the passing time of the slit can be detected. Accordingly, the origins of the rotating antennas can be detected by the photo-interrupters 36 attached to the respective motors by setting the positions of the slits 36b to the origins of the rotating antennas 38 and 39.

Additionally, the control unit has an antenna angle storage unit which stores in advance the angles (stop positions) of the rotating antennas 38 and 39 when the portions of the rotating antennas 38 and 39 which have high directivity is concentrated on local heating positions on the basis of the origins which can be detected by the origin detection mechanisms. When the operation of the rotating antennas 38 and 39 is controlled to execute local heating, the information of the antenna angle storage unit is referred to.

Figure 15:
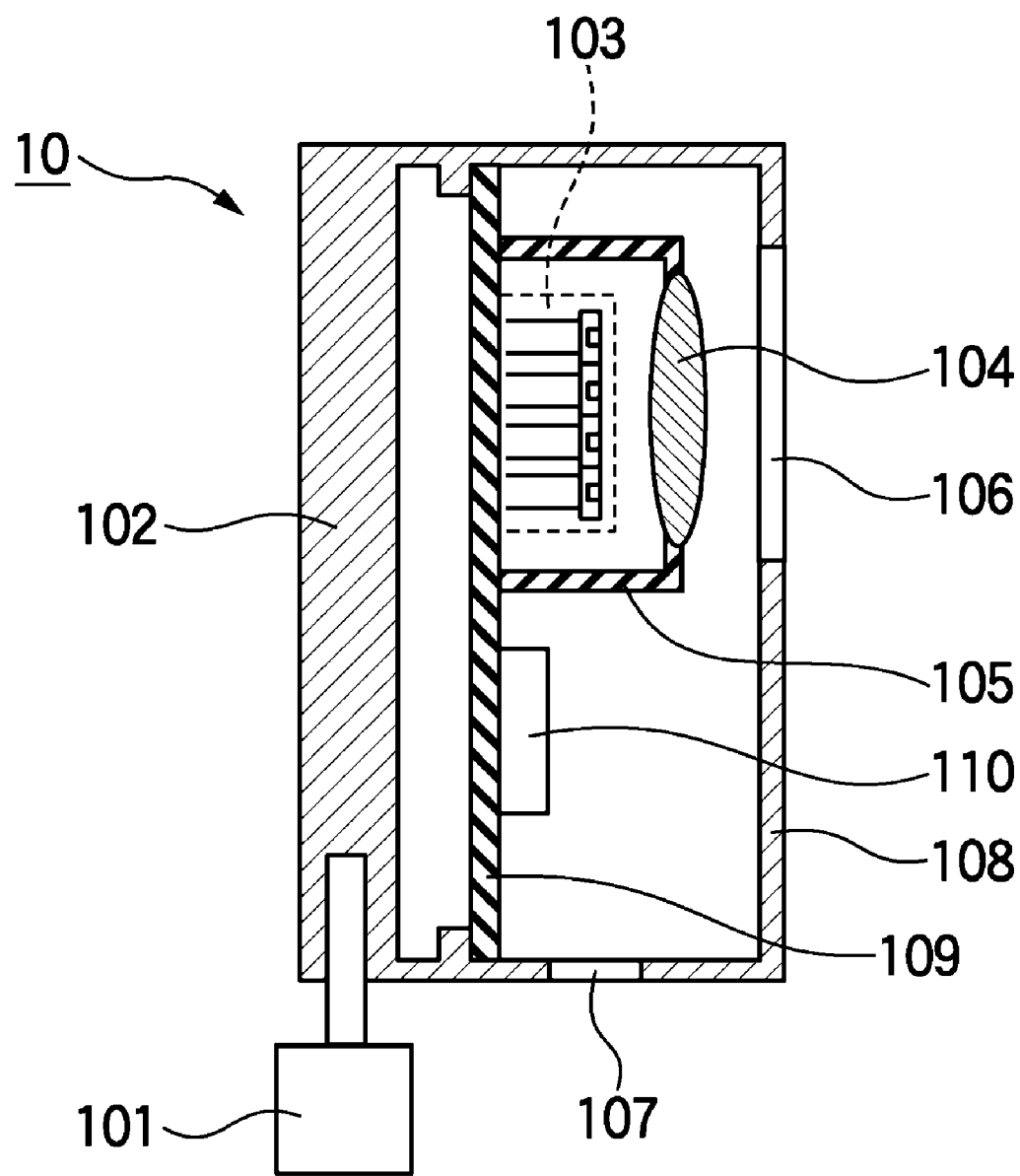
FIG. 15 is a configuration diagram of an infrared sensor 10 in the cooker of the embodiment of the invention.

Next, a temperature detecting means that the cooker of the present embodiment has will be described with reference to the configuration diagram of the infrared sensor 10 in the cooker of the embodiment of the invention shown in FIG. 15. The temperature detecting means includes a plurality of infrared detectors 103 which is lined up on a substrate 109, a case 108 which houses the whole substrate 109, and a stepping motor 101 which moves the case 108 in a direction perpendicular to a direction in which the infrared detectors 103 are lined up.

A metallic can 105 which encloses the infrared detectors 103, and an electronic circuit 110 which processes the operation of the infrared detectors are provided on the substrate 109. Additionally, the can 105 is provided with a lens 104 through which infrared rays pass. Additionally, the case 108 is provided with an infrared pass hole 106 which allows infrared rays to pass therethrough, and a hole 107 which allows a lead wire from the electronic circuit 110 to pass therethrough.

Through this configuration, as the stepping motor 101 makes a rotational motion, the case 108 can be moved in a vertical direction in which the infrared detectors 103 are lined up.

Figure 16:
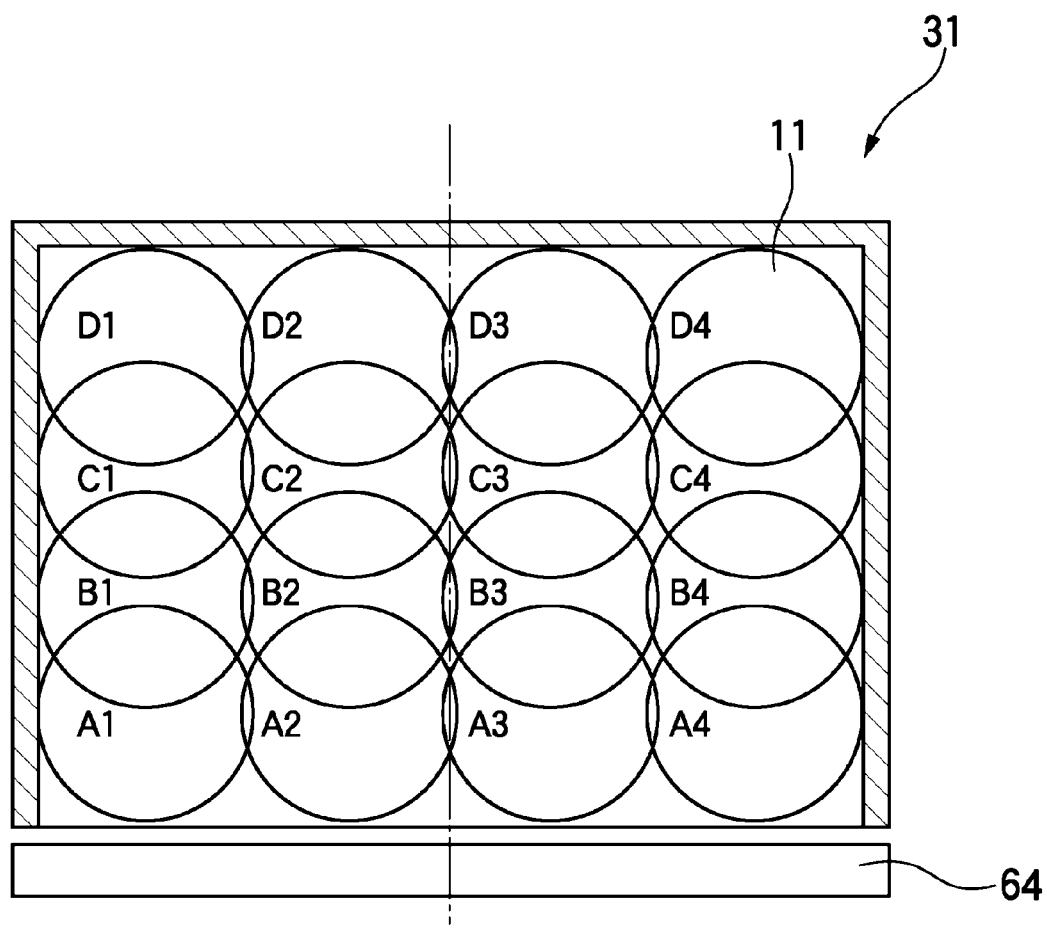
FIG. 16 is a view illustrating infrared temperature detection spots in a C-C' cross-section of FIG. 7.
Figure 17:
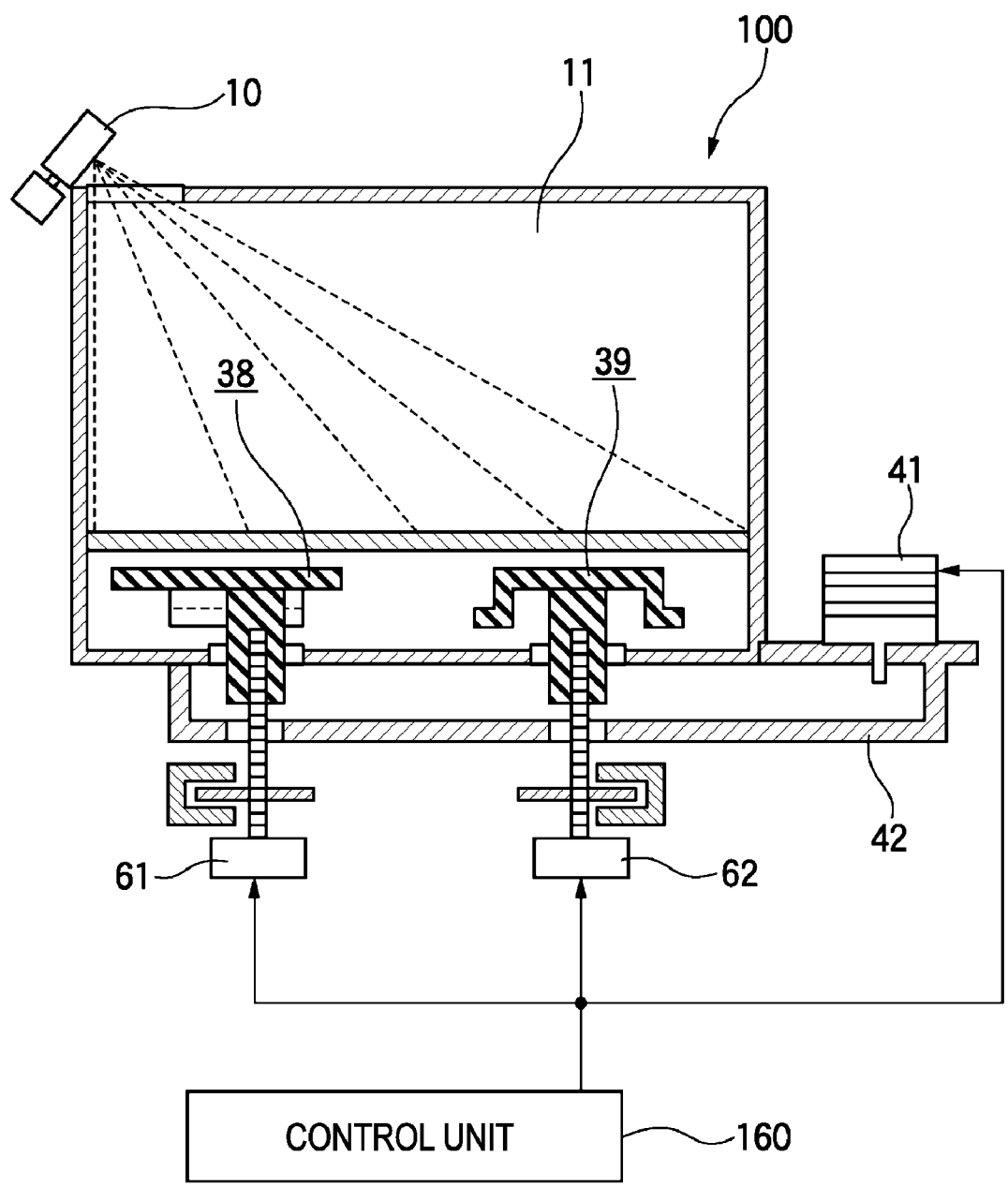
FIG. 17 is a sectional view (front view) of the cooker for explaining the infrared temperature detection spot in the embodiment of the invention.

FIG. 16 is a view illustrating infrared temperature detection spots in a C-C' cross-section of FIG. 7, and FIG. 17 is a sectional view (front view) of the cooker for explaining the infrared temperature detection spots in the embodiment of the invention. As shown in FIG. 17, as the stepping motor 101 of the temperature detecting means makes a reciprocal rotational motion on the basis of the control by the control unit 160, the cooker 100 of the present embodiment can detect the temperature distribution of almost all the regions in the heating chamber 11.

Specifically, the lined-up temperature detectors 103 (for example, infrared sensors) that are provided on the temperature detecting means first simultaneously detect, for example, the temperature distribution of A1 to A4 regions in FIG. 16. Next, when the stepping motor 101 makes a rotational motion and the case 108 moves, the temperature detectors 103 detects the temperature distribution of B1 to B4 regions. Next, when the stepping motor 101 makes a rotational motion and the case 108 moves, the temperature detectors 103 detects the temperature distribution of C1 to C4 regions, and similarly the temperature distribution of D1 to D4 regions.

Additionally, as the stepping motor 101 makes a counter-rotation subsequently to the above-described operation, temperature distribution is detected in order of C1 to C4, B1 to B4, and A1 to A4 from the D1 to D4 regions. The temperature-distribution detecting means can detect the whole temperature distribution in the heating chamber 11 by repeating the above operation.

Figure 18:
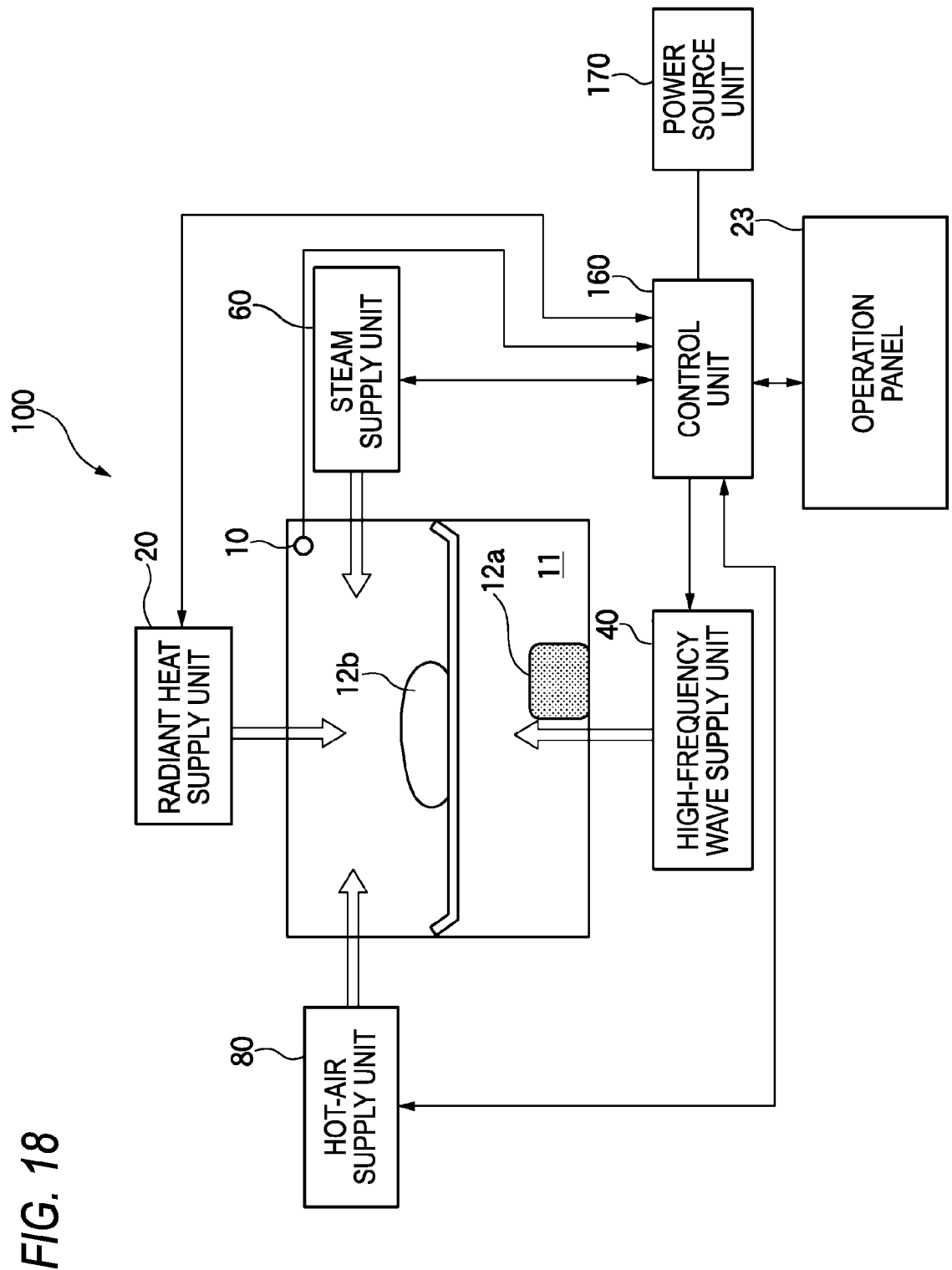
FIG. 18 is a functional block diagram showing the configuration of the cooker of the embodiment of the invention.

Subsequently, a series of processing during heating treatment with microwaves by the cooker of the embodiment of the invention will be described. FIG. 18 is a functional block diagram showing the configuration of the cooker of the embodiment of the invention.

The cooker 100 includes a high-frequency wave generating unit 40 (constituted by the magnetron 41, the waveguide 42, and the rotating antennas 43 in FIG. 2), a hot-air supply unit 80 (constituted by the communication passage 14, the circulation fan 15, and the heater 16 in FIG. 5), a radiant heat supply unit 20 (corresponds to the pipe heaters 21 in FIG. 3.), a steam supply unit 60 (corresponds to the steam generating means 60 in FIG. 2), an operation panel 23 (corresponds to the operation panel 23 in FIG. 1), an infrared sensor 10 (corresponds to the infrared sensor 10 in FIG. 7.), a power source unit 170, and a control unit 160 which controls the whole cooker 100.

The control unit 160 includes a CPU (Central Processing Unit) and a ROM (Read Only Memory) which are not shown. The CPU performs control according to the programs and data which are stored in the ROM. The control by the control unit 160 includes the control of preferentially securing the amount of supply of electric power from the power source unit 170 to any one or a plurality of the high-frequency wave generating unit 40, the hot-air supply unit 80, the radiant heat supply unit 20, and the steam supply unit 60. Through this control, any one or a plurality of the high-frequency wave generating unit 40, the hot-air supply unit 80, the radiant heat supply unit 20, and the steam supply unit 60 is (are) driven to heat the objects 12a and 12b to be heated.

Figure 19:
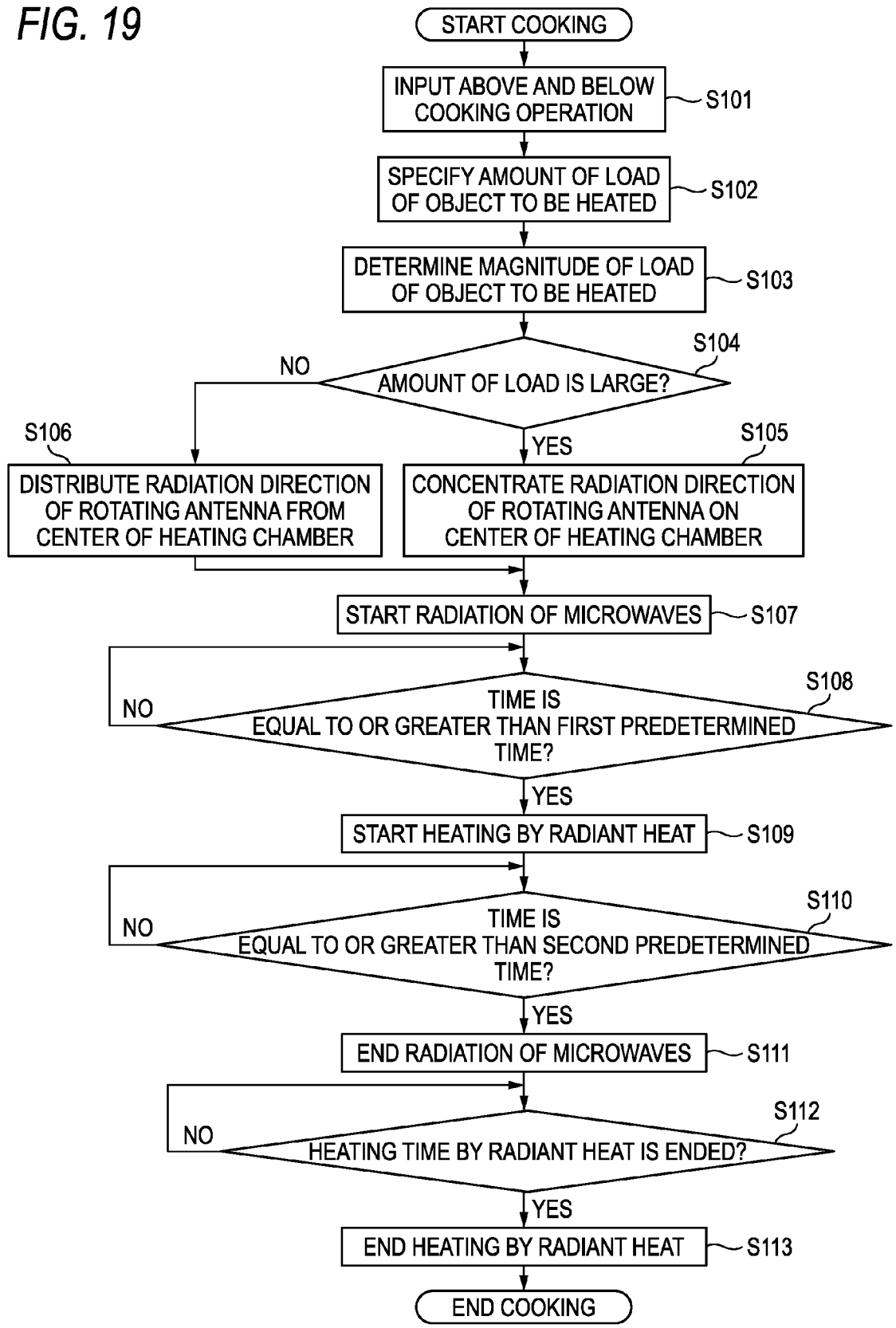
FIG. 19 is a flow chart of heating treatment by the cooker of the embodiment of the invention.

Next, the flow of processing by the cooker of the embodiment of the invention will be described. FIG. 19 is a flow chart showing the outline of heating treatment by the cooker of the embodiment of the invention.

First, the control unit receives the operation for above and below cooking, particularly, the operation of notifying the state of objects to be heated, the operation of instructing the conditions for heating treatment, and the operation of instructing the start of heating treatment, through the operation panel (Step 101). The operation of notifying the state of objects to be heated includes the operation of inputting the weight, shape, number and the like of objects to be heated. Although this input may include a configuration in which a user measures the weight, shape, and number of objects to be heated, and inputs the measured numeric values, preferably, the identification number of a certain recipe described in a recipe book which accompanies a cooker is designated by a dial of the operation panel. In this recipe book, the number of grams, number of pieces, size of raw materials required for cooking are determined for each recipe. Thus, the control unit can recognize the state of objects to be heated by receiving the operation of instructing the identification number of a recipe. In addition, the operation of notifying the state of objects to be heated of the embodiment of the invention is not indispensible, and may include a configuration in which the weight, shape, and number of objects to be heated are measured by various sensors (not shown) provided in the heating chamber, and the measured numeric values are used as input values.

Additionally, the conditions for heating treatment includes, mainly, locations where objects to be heated are placed, and methods of heating objects to be heated in every location. Specifically, the locations where objects to be heated are placed are the conditions of instructing 1. only a placing table used also as the bottom surface of the heating chamber, 2. a heating pan only, and 3. a placing table used also as the bottom surface of the heating chamber and a heating pan.

Additionally, the methods of heating objects to be heated in every location are the conditions of instructing heating methods (heating by high frequency, heating by hot blast, heating by radiant heat, heating by steam, cooking temperature by each heating method, heating time by each heating method and the like) for an object to be heated placed on a placing table used also as the bottom surface of the heating chamber and an object to be heated placed on the heating pan. Although these conditions may be input through the operation panel by a user, preferably, the order, heating temperature, heating time and the like of each heating method specified for every identification number of a recipe is referred to by receiving the operation of indicating the identification number of the recipe.

In the embodiment of the invention, a case will be described in where object to be heated is placed on 3. A placing table used also as the bottom surface of the heating chamber and a heating pan, specifically, an object to be heated which requires heating by microwaves is placed on the placing table used also as the bottom surface of the heating chamber, and an object to be heated which requires heating by radiant heat is placed on the heating pan. The other heating methods are the same as those which have conventionally been well known, and description thereof will be omitted.

The control unit specifies the amount of load of an object to be heated which is intended to be heated by microwaves and placed on the placing table used also as the bottom surface of the heating chamber, on the basis of the state (may be detected by various sensors provided in the heating chamber depending on the case) of objects to be heated detected by the operation of notifying the state of the objects to be heated received from the operation panel (Step 102). Specifically, the control unit stores a table in which the weight, shape, the number of objects to be heated are correlated with the amount of loads of the objects to be heated which have the weight, shape and the number in the ROM, and specifies an amount of load corresponding to the state of an object to be heated which has been received from the operation panel or has been detected by the various sensors, with reference to the table. In addition, the control unit may notify the state of an object to be heated by receiving the operation of instructing the identification number described in a recipe or an operation unit. Even in this case, similarly, the control unit stores a table in which an identification number described in each recipe or an operation unit are correlated with the amount of load of an object to be heated required for the recipe in the ROM, and specifies an amount of load corresponding to the identification number of the recipe which has been received from the operation panel, with reference to the table.

When the control unit specifies of the amount of load of the object to be heated, the magnitude of the amount of load is determined (Step 103), the directions in which the ends 57 and 58 of the rotating antennas 38 and 39 should be facing is determined, and the rotating antennas 38 and 39 are rotated in the determined directions. The control unit distributes the direction in which the ends 57 and 58 of the rotating antennas 38 and 39 should be facing from the middle of the heating chamber on which the objects to be heated is placed, and concentrate the orientation on the heating pan (Step 105) as the amount of load of the object to be heated placed on the placing table used also as the bottom surface of the heating chamber is larger (Step 104, Y), and concentrates the direction in which the ends 57 and 58 of the rotating antennas 38 and 39 should be facing, on the center of the heating chamber (Step 106) as the amount of load of the objects to be heated is smaller (Step 104, N).

In addition, during the heating by microwaves, steam may be supplied from the steam supply unit 60 so as to heat the object to be heated placed on the placing table used also as the bottom surface of the heating chamber and the object to be heated placed on the heating pan in combination. Thereby, the objects to be heated can be heated with moisture being applied to the surfaces of the objects to be heated.

Through this processing, if the amount of load of a first object to be heated placed on the placing table 11a used also as the bottom surface of the heating chamber is large, the portions of the rotating antennas 38 and 39 which have high radiation directivity are not turned to face the object to be heated. However, the portions of the rotating antennas 38 and 39 of which the radiation directivity is not so high are turned to face the object to be heated, and the amount of load is large. Therefore, the microwaves radiated from these portions can be efficiently absorbed to sufficiently heat the object to be heated. On the other hand, any object to be heated does not exist in a direction in which the portions of the rotating antennas 38 and 39 which have high radiation directivity are facing. Accordingly, the microwaves radiated from the rotating antennas 38 and 39 can reach the heating pan 30 with minimum damping, thereby raising the temperature of the heating pan, and pass through the peripheral portion of the heating pan 30 with minimum damping, thereby heating the object 12b to be heated placed on the heating pan 30.

The control unit supplies electric power to the high-frequency wave generating unit 40 after the rotating antennas 38 and 39 are rotated, thereby starting the radiation of microwaves (Step 107). Thereafter, the radiation of the microwaves by the above rotating antennas 38 and 39 is continued until a first predetermined time (this is stored in advance depending on the weight, shape, number and the like of specified first and second objects to be heated in a combination of the first and second objects to be heated for every combination thereof) (Step 108, Y) in a combination of certain first and second objects to be heated which is specified by the control unit. Thereby, the first object to be heated is actively heated, and the heating pan 30 and the second object to be heated on the heating pan are preheated.

When the control unit determines that the first predetermined time has been reached (Step 108, Y), the control unit supplies electric power to the radiant heat supply unit 20 to start the heating by radiant heat, in order to heat the object to be heated placed on the heating pan 30 (Step 109). Thereafter, when a predetermined time has lapsed, and a second predetermined time which is determined in advance is reached (this is also stored in advance depending on the weight, shape, number and the like of specified first and second objects to be heated in a combination of the first and second objects to be heated for every combination thereof, and the time when the heating of the first object to be heated is completed) (Step 110, Y), the heating by radiant heat is stopped (Step 111).

In this way, in this cooker, even in a case where the amount of load of the first object to be heated placed on the placing table 11a used also as the bottom surface of the heating chamber is large, the temperature of the heating pan 30 when the heating by radiant heat is started is already slightly lower compared to a case where the amount of load is small, but is sufficiently raised, and the object to be heated placed on the heating pan 30 is also preheated by irradiation by microwaves. Therefore, the heating time when both the objects are simultaneously heated can be shortened compared to a total of the heating time when the first object to be heated and the second object to be heated are independently heated.

Additionally, even in a case where the amount of load of the object to be heated placed on the placing table used also as the bottom surface of the heating chamber is small, it can be said that, when the heating by radiant heat starts, the heating pan 30 is sufficiently heated compared to the case where an object to be heated is placed only on the heating pan and the heating of the object to be heated by radiant heat and the rise in temperature of the heating pan by microwaves are simultaneously started as in the conventional one, and the heating time when both the objects are simultaneously heated can be shortened compared to a total of the heating time when the first object to be heated and the second object to be heated are independently heated.

The control unit continues the heating by radiant heat for a predetermined time after the radiation of the microwaves by the rotating antennas 38 and 39 is stopped (Step 112). In addition, this predetermined time is also stored in advance as the time when the heating of the second object to be heated is completed according to the weight, shape, number and the like of specified first and second objects to be heated in a combination of specified first and second objects to be heated for every combination thereof, and is specified depending on the heating time referred to when the operation of instructing the identification number of a recipe has been received. However, the heating time may be specified by the heating time input by a user through the operation panel before the cooking by the cooker is started.

In addition, during heating, steam may be supplied from the steam supply unit 60 so as to heat the object to be heated placed on the placing table used also as the bottom surface of the heating chamber and the object to be heated placed on the heating pan in combination. Thereby, the objects to be heated can be heated with moisture being applied to the surfaces of the objects to be heated. Moreover, a case where grill cooking or oven cooking is performed on the object to be heated placed on the heating pan is conceivable. When grill cooking is performed, the heating by steam is also used, so that the inside of the object to be heated can be finished so as to be juicy while preventing the surface from being excessively burnt. On the other hand, when the oven cooking is performed, the steam is also used, so that internal cooking can be improved, the surface the object to be heated can be finished so as to be crisp, and the inside thereof can be finished so as to be juicy.

Then, when the heating by radiant heat is continued for a predetermined time (Step 112, Y), the control unit stops the heating by radiant heat (Step 113), and stops a series of heating treatment.

As described above, in the conventional cooker, when an object to be heated is placed on the placing table used also as the bottom surface of the heating chamber, it is not possible to sufficiently raise the temperature of the heating pan. However, according to the cooker of the embodiment of the invention, even when an object to be heated is placed on the placing table used also as the bottom surface of the heating chamber, the temperature of the heating pan can be effectively raised. Additionally, an object to be heated which is a heating target by radiant heat and which is placed on the heating pan can be heated by microwaves before the heating by radiant heat. This can realize a new cooking method of starting and completing heating treatment in a state where separate objects to be heated are respectively placed on the placing table used also as the bottom surface of the heating chamber and the heating pan, that is suggesting the above and below heating that the upper and lower spaces partitioned by the heating pan are heated in one process, which was not in the previous cooking methods.

Additionally, the orientation of the rotating antenna is controlled according to states, such as the shape, weight, and the number of objects to be heated placed on the placing table used also as the bottom surface of the heating chamber, so that the radiation of microwaves to an object to be heated placed on the placing table used also as the bottom surface of the heating chamber or the radiation of microwaves to the peripheral portion of a heating pan, or a heating pan can be suitably switched.

Additionally, the heating pan or an object to be heated placed on the heating pan is heated by microwaves as mentioned above before the object to be heated placed on the heating pan is heated by radiant heat, so that the time when both the objects are simultaneously heated can be shortened compared to a total of the heating time when the first object to be heated and the second object to be heated are independently heated.

Additionally, if a proper quantity of an object to be heated is placed on the placing table used also as the bottom surface of the heating chamber and the heating pan according to a recipe book which accompanies a cooker, the cooker can be made to perform above and below heating treatment simply by inputting the identification information which specifies a recipe. As a result, a user is released from complicated input operation accompanying above and below heating.

Here, an example of the above and below heating treatment by the cooker of the embodiment of the invention will be further described. FIGS. 20 to 26 show time charts showing driving situations of respective heat sources during above and below heating treatment by the cooker of the embodiment of the invention.

Figure 20:
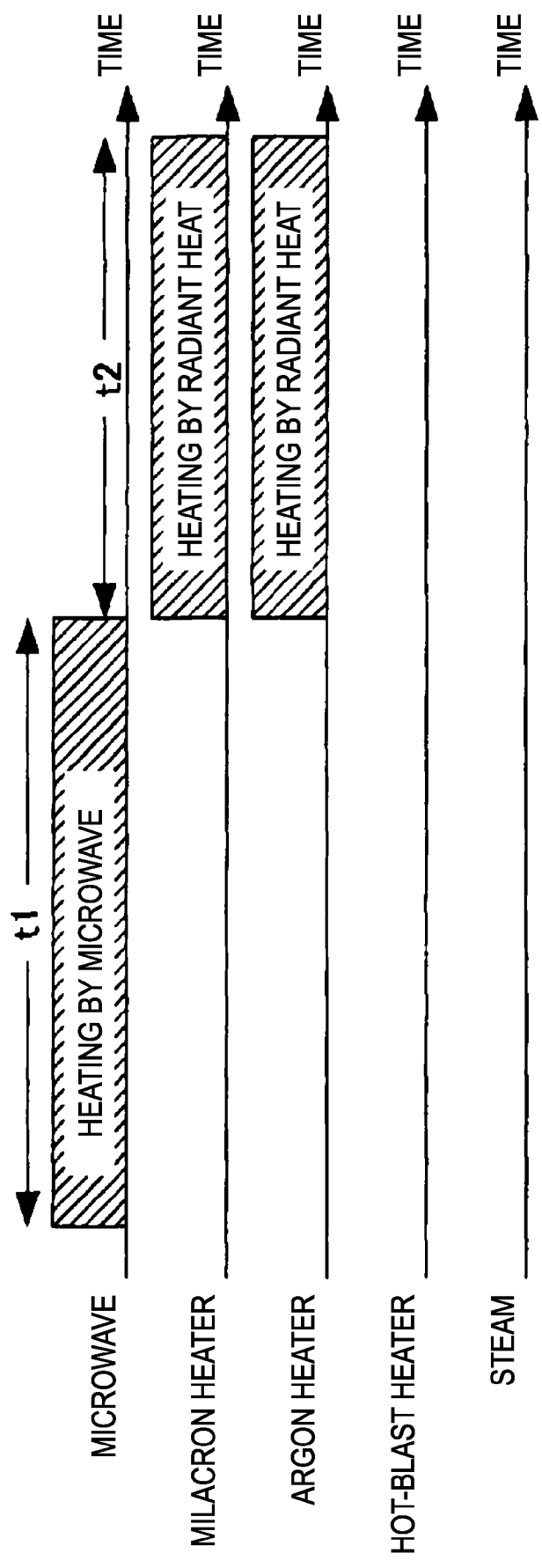
FIG. 20 is a time chart showing driving situations of respective heat sources during above and below heating treatment by the cooker of the embodiment of the invention.

In the time chart of FIG. 20, first, the object 12a to be heated placed on the placing table used also as the bottom surface of the heating chamber 11, and the heating pan 30 are heated by starting the supply of electric power to the high-frequency wave generating means 40, and radiating microwaves for a predetermined time t1 from the high-frequency wave generating means 40. In addition, at this time, the object 12b to be heated placed on the heating pan 30 is also heated by microwaves which pass through the peripheral portion of the heating pan 30, and propagate to the upper space partitioned by the heating pan 30. When the predetermined time t1 has elapsed after the high-frequency wave generating means 40 starts the radiation of microwaves, the supply of electric power to the high-frequency wave generating means 40 is stopped to start the supply of electric power to the Milacron heaters 21b and the argon heater 21a, and the object to be heated placed on the heating pan 30 by the radiant heat from the Milacron heaters 21b and the argon heater 21a is heated for a predetermined time t2. Then, when the heating by radiant heat lasts for the predetermined time t2, the supply of electric power to the Milacron heaters 21b and the argon heater 21a is stopped, and the heating by radiant heat is ended.

As shown on the time chart of FIG. 20, a cooking method which drives respective heat sources is suited to the cooking in a case where an object to be heated containing a lot of moisture is placed on the placing table used also as the bottom surface of the heating chamber 11, and an object to be heated which needs preponderant heating of its surface is placed on the heating pan 30. For example, the cooking method is suited to the cooking in a case where a sauce is placed on the placing table used also as the bottom surface of the heating chamber 11, and a hamburger over which the sauce is to be poured is placed on the heating pan 30. If cooking is started by this cooking method after two objects to be heated (for example, a sauce and a hamburger) are placed in the heating chamber, the heating (heating by microwaves) of an object to be heated placed on the placing table used also as the bottom surface of the heating chamber 11, and the heating (heating by radiant heat) of an object to be heated placed on the heating pan 30 can be performed by a series of treatments. Moreover, at the time of the start of heating by both the heaters 21b and 21a, the heating pan 30 is already heated to a certain degree of temperature, and the lower surface of the hamburger is heated. Thus, the lower surface of the hamburger which is hardly heated by the heating from above by the heaters 21b and 21a can be heated well, similarly to the upper surface. For this reason, it is not necessary to replace an object to be heated when heating is performed after switching from a certain heat source to another heat source, as in a conventional cooker. Additionally, even when above and below heating treatment is simultaneously performed, both upper and lower items of food can be finished well, and can improve convenience in cooking for the user.

Additionally, as another example, the cooking method is suited to the cooking in a case where boiled food such as vegetables is placed on the placing table used also as the bottom surface of the heating chamber 11, and a salted mackerel is placed on the heating pan 30. If two objects to be heated (for example, boiled food such as vegetables and a salted mackerel) are placed in the heating chamber and cooking is started by this cooking method, a large amount of steam is discharged from the boiled food such as vegetables placed on the placing table used also as the bottom surface of the heating chamber 11 by the heating (heating by microwaves) of the object to be heated placed on the placing table used also as the bottom surface of the heating chamber 11, and condensation is formed on the surface of the salted mackerel placed on the heating pan 30. Moreover, at the time of the start of heating by both the heaters 21b and 21a, the heating pan 30 is already heated to a certain degree of temperature, and the lower surface of the salted mackerel is heated. Additionally, the salted mackerel itself has been warmed by the microwaves which have passed through the peripheral portion of the heating pan. Thus, the condensation on the surface of the object to be heated turns into warm water, and rinses the salinity of the surface, which brings about a low-salt effect. The heating from above by the heaters 21b and 21a is added, and good heating of the upper and lower surfaces of the salted mackerel becomes possible. For this reason, it is not necessary to replace an object to be heated when heating is performed after switching from a certain heat source to another heat source, as in a conventional cooker. Additionally, even when above and below cooking is simultaneously performed, both upper and lower items of food can be finished well, and can improve convenience in cooking for the user.

Figure 21:
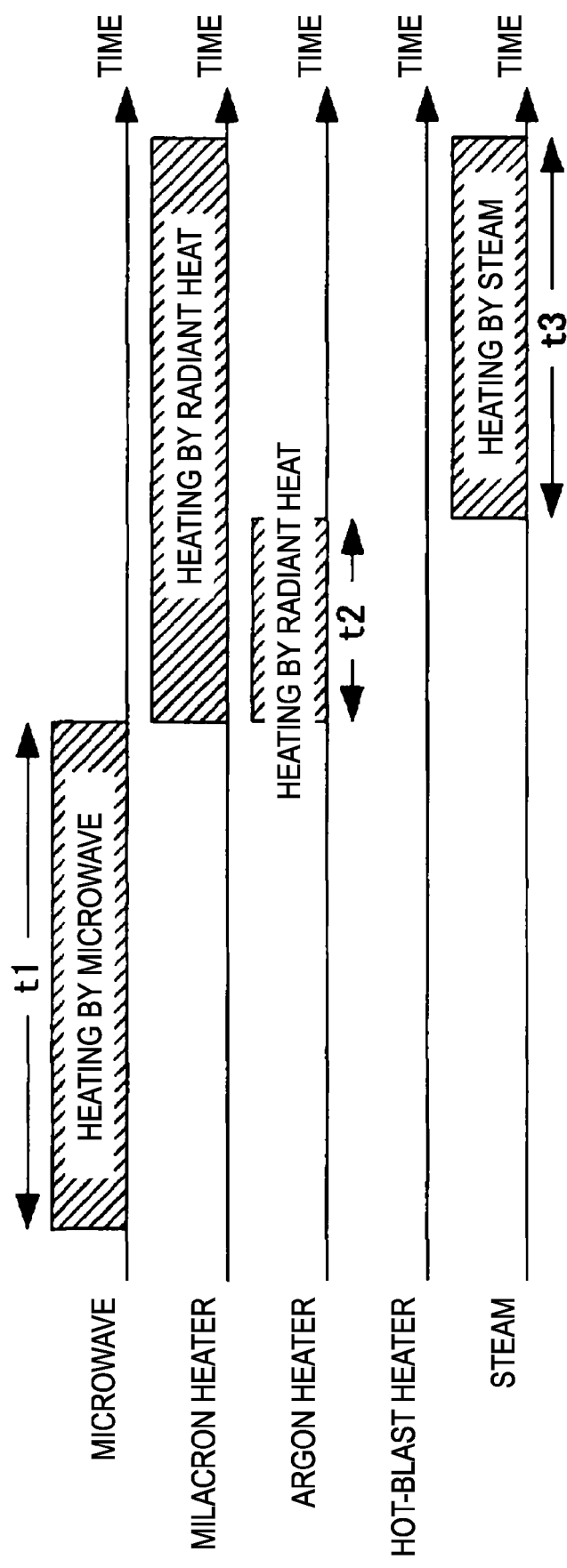
FIG. 21 is a time chart showing driving situations of respective heat sources during above and below heating treatment by the cooker of the embodiment of the invention.

In the time chart of FIG. 21, first, the object 12a to be heated placed on the placing table used also as the bottom surface of the heating chamber 11, and the heating pan 30 are heated by starting the supply of electric power to the high-frequency wave generating means 40, and radiating microwaves for a predetermined time t1 from the high-frequency wave generating means 40. In addition, at this time, the object 12b to be heated placed on the heating pan 30 is also heated by microwaves which pass through the peripheral portion of the heating pan 30, and propagate to the upper space partitioned by the heating pan 30. When the predetermined time t1 has elapsed after the high-frequency wave generating means 40 starts the radiation of microwaves, the supply of electric power to the high-frequency wave generating means 40 is stopped to start the supply of electric power to the Milacron heaters 21b and the argon heater 21a, and the object to be heated placed on the heating pan 30 to be heated by the radiant heat from the Milacron heaters 21b and the argon heater 21a is heated for a predetermined time t2. Then, when the heating by radiant heat lasts for the predetermined time t2, the supply of electric power to the Milacron heaters 21b continues, while the supply of electric power to the argon heater 21a is stopped, and the supply of electric power to the steam generating means 60 is started instead. Then, when the heating by the radiant heat from the Milacron heaters 21b and the heating by steam last for a predetermined time t3, the supply of electric power to the Milacron heaters 21b and the steam generating means 60 is stopped, and the heating by radiant heat and steam is ended.

As shown on the time chart of FIG. 21, a cooking method which drives respective heat sources is suited to the cooking in a case where an object to be heated containing a lot of moisture is placed on the placing table used also as the bottom surface of the heating chamber 11, and an object to be heated which needs preponderant heating of its surface and needs moisturizing of the surface is placed on the heating pan 30. For example, the cooking method is suited to the cooking in a case where chop suey is placed on the placing table used also as the bottom surface of the heating chamber 11, and a fried chicken is placed on the heating pan 30. If cooking is started by this cooking method after two objects to be heated (for example, chop suey and a fried chicken) are placed in the heating chamber, the heating (heating by microwaves) of an object to be heated placed on the placing table used also as the bottom surface of the heating chamber 11, and the heating (heating by radiant heat and steam) of an object to be heated placed on the heating pan 30 can be performed within rated power by a series of treatments. For this reason, it is not necessary to replace an object to be heated when heating is performed after switching from a certain heat source to another heat source, as in a conventional cooker, and can improve convenience in cooking for the user. Additionally, when the heating (heating by microwaves) of an object to be heated, containing much moisture, placed on the placing table used also as the bottom surface of the heating chamber 11 is started, a lot of steam is generated from the objects to be heated themselves with the rise in temperature of the object to be heated, and when the predetermined time t1 ends, the inside of the heating chamber is filled with steam, and then, the radiation heating of the object to be heated placed on the heating pan 30 is started by the argon heater 21a and the Milacron heaters 21b. In addition, since the infrared rays of a wavelength radiated from the argon heater have a wavelength which easily transmits the steam, and therefore, the heating by the argon heater is not hindered by the steam, the object to be heated can be efficiently and directly heated. Additionally, the steam itself filled into the heating chamber using the Milacron heaters 21b can be warmed and heated to the ambient temperature, thereby performing steaming and roasting.

When the predetermined time t2 ends, heating is made by the pipe heaters 21, the ambient temperature of the heating chamber near the object to be heated becomes 100° C. or higher, and the steam becomes superheated steam. At this point in time, the superheated steam acts not to give moisture to the surface of an object to be heated, but to dry and brown the surface, and the far infrared rays radiated from the Milacron heaters 21b perform radiation heating of the object to be heated without being shielded by the steam, and begin to burn the surface. The heating by the argon heater 21a is stopped, the supply of electric power to the steam generating means 60 is started instead, and the heating by the radiant heat from the Milacron heaters 21b and the heating by steam lasts for a predetermined time t3. Since the steam supplied from the steam generating means is heated into superheated steam by the Milacron heaters, and surrounds and heats the periphery of an object to be heated, the whole surface of the object to be heated can be more efficiently and uniformly heated than heating only by the radiation heating of the Milacron heaters, and can be finished to a beautiful burnt color by preventing partial burning, and the whole surface can be finished to a desirable crispy texture.

Figure 22:
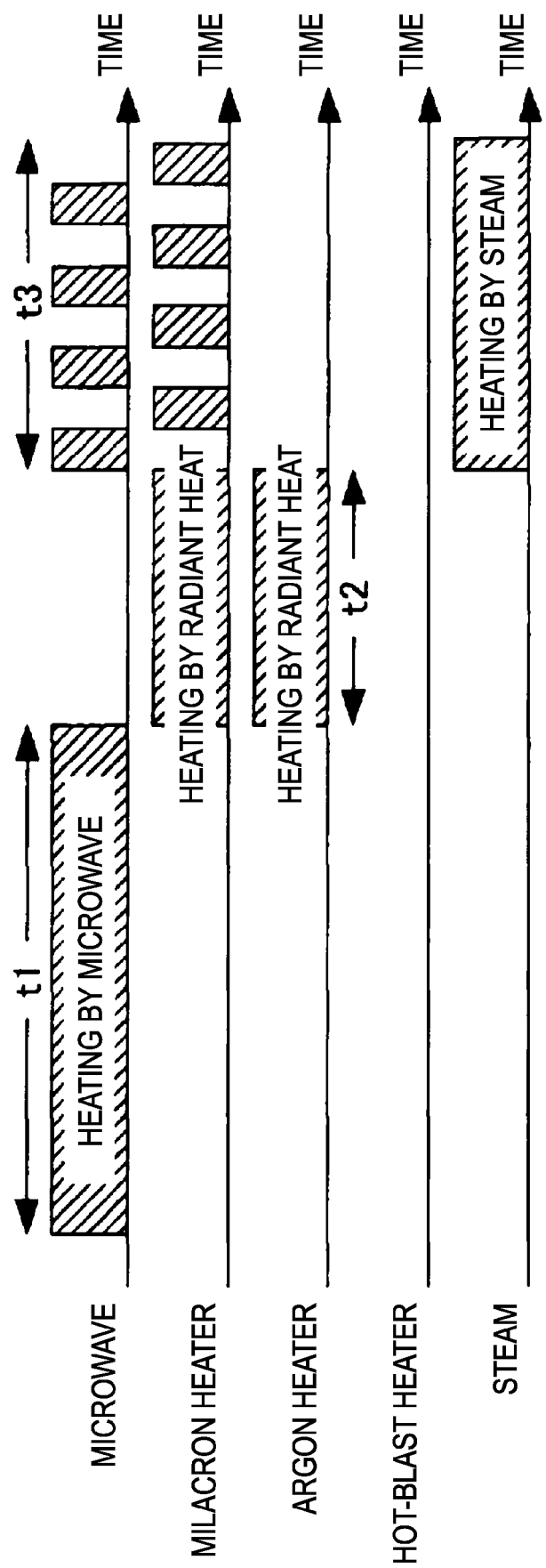
FIG. 22 is a time chart showing driving situations of respective heat sources during above and below heating treatment by the cooker of the embodiment of the invention.

In the time chart of FIG. 22, first, the object 12a to be heated placed on the placing table used also as the bottom surface of the heating chamber 11, and the heating pan 30 are heated by starting the supply of electric power to the high-frequency wave generating means 40, and radiating microwaves for a predetermined time t1 from the high-frequency wave generating means 40. In addition, at this time, the object 12b to be heated placed on the heating pan 30 is also heated by microwaves which pass through the peripheral portion of the heating pan 30, and propagate to the upper space partitioned by the heating pan 30. When the predetermined time t1 has elapsed after the high-frequency wave generating means 40 starts the radiation of microwaves, the supply of electric power to the high-frequency wave generating means 40 is stopped to start the supply of electric power to the Milacron heaters 21b and the argon heater 21a, and the object to be heated placed on the heating pan 30 is heated for a predetermined time t2 by the radiant heat from the Milacron heaters 21b and the argon heater 21a. Then, when the heating by radiant heat lasts for the predetermined time t2, the supply of electric power to the argon heater 21a is stopped, and the alternate supply of electric power to the high-frequency wave generating means 40 and the Milacron heaters 21b is started, and simultaneously the supply of electric power to the steam generating means 60 is started. The heating by the high-frequency wave generating means 40, the Milacron heaters 21b, and the steam generating means 60 lasts for the predetermined time t3. When the heating by the high-frequency wave generating means 40 and the Milacron heaters 21b to which electric power is alternately supplied, and the heating by the steam generating means 60 lasts for the predetermined time t3, the supply of electric power to the high-frequency wave generating means 40, the Milacron heaters 21b, and the steam generating means 60 is stopped, and the heating by radiant heat and steam is ended.

As shown on the time chart of FIG. 22, a cooking method which drives respective heat sources is suited to the cooking in a case where an object to be heated containing a lot of moisture is placed on the placing table used also as a bottom surface of the heating chamber 11, and an object to be heated which needs preponderant heating of its surface and needs moisturizing of the surface is placed on the heating pan 30. For example, the cooking method is suited to the cooking in a case where chop suey is placed on the placing table used also as the bottom surface of the heating chamber 11, and a fried chicken is placed on the heating pan 30. If cooking is started by this cooking method after two objects to be heated (for example, teriyaki chicken and cooked vegetables) are placed in the heating chamber, the heating (heating by microwaves) of an object to be heated placed on the placing table used also as the bottom surface of the heating chamber 11, and the heating (heating by radiant heat and steam) of an object to be heated placed on the heating pan 30 can be performed within rated power by a series of treatments. Moreover, when the heating by both the heaters 21b and 21a is started, since the heating pan 30 is already heated to a certain degree of temperature, and heats the lower surface of the object to be heated on the heating pan. For this reason, it is not necessary to replace an object to be heated when heating is performed after switching from a certain heat source to another heat source, as in a conventional cooker, and can improve convenience in cooking for the user. Additionally, when the heating (heating by microwaves) of an object to be heated, containing much moisture, placed on the placing table used also as the bottom surface of the heating chamber 11 is started, a lot of steam is generated from the objects to be heated themselves with the rise in temperature of the object to be heated, and when the predetermined time t1 ends, the inside of the heating chamber is filled with steam, and then, the radiation heating of the object to be heated placed on the heating pan 30 is started by the argon heater 21a and the Milacron heaters 21b. Since the infrared rays of a wavelength radiated from the argon heater have a wavelength which easily transmits the steam, and therefore, the heating by the argon heater is not hindered by the steam, the object to be heated can be efficiently and directly heated. Additionally, the steam itself filled into the heating chamber using the Milacron heaters 21b can be warmed and heated to the ambient temperature, thereby performing steaming and roasting.

When the predetermined time t2 ends, heating is made by the pipe heaters 21, the ambient temperature of the heating chamber near the object to be heated becomes 100° C. or higher, and the steam becomes superheated steam. At this point in time, the superheated steam acts not to give moisture to the surface of an object to be heated, but to dry and brown the surface, and the far infrared rays radiated from the Milacron heaters 21b perform radiation heating of the object to be heated without being shielded by the steam, and begin to burn the surface. Since teriyaki or dipping and frying is dipped in seasoning materials, such as soy sauce, mirin, and sugar, which are apt to be burnt, burning occurs readily and abruptly. Thus, the heating of the argon heater 21a is stopped, and the output of the Milacron heaters is reduced, the supply of electric power to the steam generating means 60 and the high-frequency wave generating means is started instead. Then, the heating by the radiant heat from the Milacron heaters 21b, the heating by steam, and the heating by microwaves last for the predetermined time t3 so that the internal temperature of an object to be heated rises while preventing excessive burning. Since the steam supplied from the steam generating means is heated into superheated steam by the Milacron heaters, and surrounds and heats the periphery of an object to be heated, the whole surface of the object to be heated can be more efficiently and uniformly heated than heating only by the radiation heating by the Milacron heaters, and can be finished to a beautiful burnt color by preventing partial burning. Additionally, since microwaves are radiated, the object to be heated placed on the heating pan can be heated from the bottom surface, and a meat portion can also be sufficiently heated by the transmission of heat into the inside. Additionally, the temperature of an object to be heated placed on the placing table used also as the bottom surface of the heating chamber can be prevented from falling.

In addition, even if the heating by the argon heater and the heating by the steam are used together, since the radio waves of a wavelength radiated from the argon heater have a wavelength which easily transmits the steam, the heating by the argon heater is not hindered by the steam.

Figure 23:
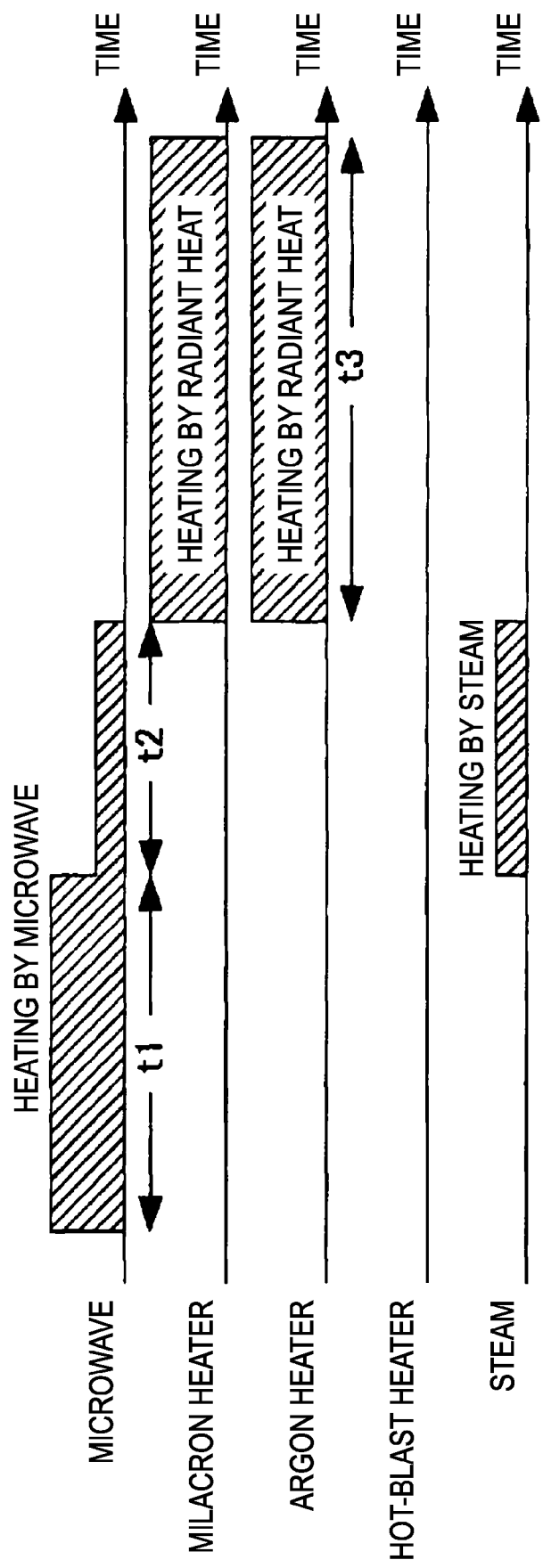
FIG. 23 is a time chart showing driving situations of respective heat sources during above and below heating treatment by the cooker of the embodiment of the invention.

In the time chart of FIG. 23, first, the object 12a to be heated placed on the placing table used also as the bottom surface of the heating chamber 11, and the heating pan 30 are heated by starting the supply of electric power to the high-frequency wave generating means 40, and radiating microwaves for a predetermined time t1 from the high-frequency wave generating means 40. When the predetermined time t1 has elapsed after the high-frequency wave generating means 40 starts the radiation of microwaves, the output of microwaves to be radiated from the high-frequency wave generating means 40 is made small by reducing the electric energy to be supplied to the high-frequency wave generating means 40, and the electric energy equivalent to the reduced electric energy is supplied to the steam generating means 60. When the predetermined time t2 for which the supply of electric power to the high-frequency wave generating means 40 and the steam generating means 60 has elapsed, the supply of electric power to the high-frequency wave generating means 40 and the steam generating means 60 is stopped to start the supply of electric power to the Milacron heaters 21b and the argon heater 21a, and the object to be heated placed on the heating pan 30 is heated for a predetermined time t3 by the radiant heat from the Milacron heaters 21b and the argon heater 21a. Then, when the heating by the Milacron heaters 21b and the argon heater 21a lasts for the predetermined time t3, the supply of electric power to the Milacron heaters 21b and the argon heater 21a is stopped, and the heating by radiant heat is ended.

As shown on the time chart of FIG. 23, a cooking method which drives respective heat sources is suited to the cooking in a case where an object to be heated containing a lot of moisture is placed on the placing table used also as a bottom surface of the heating chamber 11, and an object to be heated which needs preponderant heating of its surface and needs moisturizing of the surface before the preponderant heating of the surface is placed on the heating pan 30. For example, the cooking method is suited to the cooking in a case where a starchy vegetable sauce is placed on the placing table used also as the bottom surface of the heating chamber 11, and fried noodles are placed on the heating pan 30. If cooking is started by this cooking method after two objects to be heated (for example, a starchy vegetable sauce and fried noodles) are placed in the heating chamber, the heating (heating by microwaves) of an object to be heated placed on the placing table used also as the bottom surface of the heating chamber 11, and the heating (heating by radiant heat and steam) of an object to be heated placed on the heating pan 30 can be performed within rated power by a series of treatments. Moreover, when the heating by both the heaters 21b and 21a is started, since the heating pan 30 is already heated to a certain degree of temperature, and heats the lower surface of the object to be heated on the heating pan. Moreover, steam enters surface of the object to be heated placed on the heating pan 30, and adds moisture. For this reason, it is not necessary to replace an object to be heated when heating is performed after switching from a certain heat source to another heat source, as in a conventional cooker, and can improve convenience in cooking for the user. The raw material of the fried noodles placed on the heating pan 30 is a starch material, and both moisture and heat are indispensable to heating (gelatinizing) of the starch. When the heating by both the heaters 21b and 21a is started, the fried noodles already placed on the heating pan 30 have moisture sufficiently added thereto by the steam, and are in the best condition for heating (gelatinizing) of starch. When the heating by the Milacron heaters 21b and the argon heater 21a lasts for the predetermined time t3, the fried noodles can be heated to a state where the noodles are plump and soft, and are smoothly swallowed in a throat, and the surfaces of the noodles are moderately browned and finished to a texture which is crispy like fried noodles. Then, the supply of electric power to the Milacron heaters 21b and the argon heater 21a is stopped, and the heating by radiant heat is ended. In addition, even if the heating by the argon heater and the heating by the steam are used together, since the radio waves of a wavelength radiated from the argon heater have a wavelength which easily transmits the steam, the heating by the argon heater is not hindered by the steam.

Figure 24:
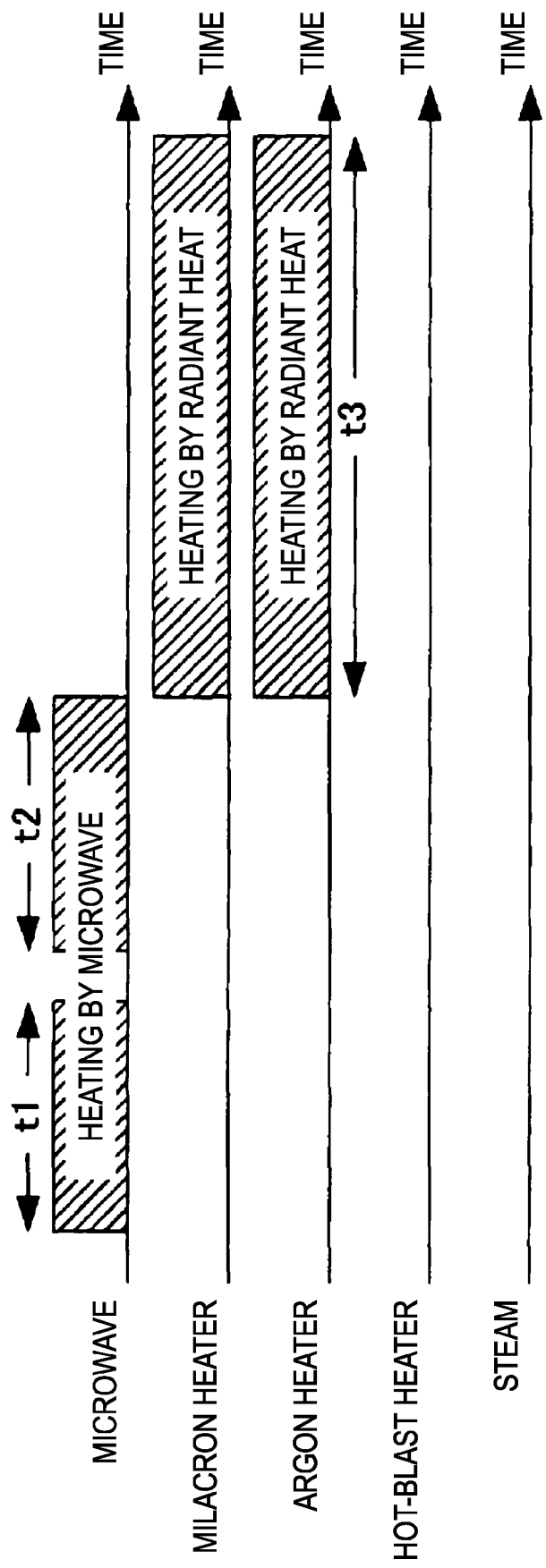
FIG. 24 is a time chart showing driving situations of respective heat sources during above and below heating treatment by the cooker of the embodiment of the invention.

In the time chart of FIG. 24, first, first, the object 12a to be heated placed on the placing table used also as the bottom surface of the heating chamber 11, and the heating pan 30 are heated by starting the supply of electric power to the high-frequency wave generating means 40, and radiating microwaves for a predetermined time t1 from the high-frequency wave generating means 40. In addition, at this time, the object 12b to be heated placed on the heating pan 30 is also heated by microwaves which pass through the peripheral portion of the heating pan 30, and propagate to the upper space partitioned by the heating pan 30. When the predetermined time t1 has elapsed after the high-frequency wave generating means 40 starts the radiation of microwaves, the supply of electric power to the high-frequency wave generating means 40 is first stopped, and a notification means, such as the operation panel 23 provided in the cooker of the invention, or a buzzer, is made to output a notification display, a notification sound, etc., thereby urging the taking out of the object 12a to be heated placed on the placing table used also as the bottom surface of the heating chamber 11. Thereafter, when the object 12a to be heated placed on the placing table used also as the bottom surface of the heating chamber 11 is taken out (for example, when a pressure sensor provided on the placing table used also as the bottom surface of the heating chamber 11 detects the taking out of the object 12a to be heated, or detects the opening and closing of a door 64 of the heating chamber 11), the heating pan 30 is heated by starting the supply of electric power to the high-frequency wave generating means 40 again, and radiating microwaves for the predetermined time t2 from the high-frequency wave generating means 40. As the situation where the object 12a to be heated placed on the placing table used also as the bottom surface of the heating chamber 11 is taken out, a case where the amount of load of the object 12a to be heated is small and the object to be heated can be sufficiently heated by the radiation of microwaves for a short period of time, a case where an object to be heated is composed of a material through which heat is easily transmitted, and can be sufficiently heated by the microwaves for a short period of time, or a case where it is desired to sufficiently heat the bottom surface (surface in contact with the heating pan 30) of the object 12b to be heated placed on the heating pan 30 can be considered. Since the microwaves radiated from the high-frequency wave generating means 40 can be most efficiently irradiated onto the heating pan 30 by taking out the object 12a to be heated first, the temperature of the heating pan 30 can be raised in a short period of time. In addition, the taking out of the object 12a to be heated mentioned above is not necessarily indispensable. The temperature of the heating pan 30 can be raised even if the object 12a to be heated is not taken out, by controlling the orientation of the rotating antennas 38 and 39 to radiate microwaves in orientations in which the microwaves are not directly radiated to the object 12a to be heated from the rotating antennas 38 and 39, after the predetermined time t1 has elapsed.

When the predetermined time t2 has elapsed after the high-frequency wave generating means 40 starts the radiation of microwaves, the supply of electric power to the high-frequency wave generating means 40 is stopped to start the supply of electric power to the Milacron heaters 21b and the argon heater 21a, and the object to be heated placed on the heating pan 30 is heated for a predetermined time t3 by the radiant heat from the Milacron heaters 21b and the argon heater 21a. Then, when the heating by the Milacron heaters 21b and the argon heater 21a lasts for the predetermined time t3, the supply of electric power to the Milacron heaters 21b and the argon heater 21a is stopped, and the heating by radiant heat is ended.

As shown on the time chart of FIG. 24, a cooking method which drives respective heat sources is suited to the cooking in a case where an object to be heated which has a small amount of load is placed on the placing table used also as the bottom surface of the heating chamber 11, a case where an object to be heated is composed of a material through which heat is easily transmitted, and can be sufficiently heated by microwaves for a short period of time, or a case where an object to be heated which needs preponderant heating of its bottom surface is placed on the heating pan 30. For example, the cooking method is suited to the cooking in a case where boiled leaf vegetables are placed on the placing table used also as the bottom surface of the heating chamber 11, and broiled fish is placed on the heating pan 30. Additionally, if two objects to be heated are placed in the heating chamber and cooking is started by controlling the orientation of the rotating antennas 38 and 39 to radiate microwaves in orientations in which the microwaves are not directly radiated to the object 12a to be heated from the rotating antennas 38 and 39, the heating (heating by microwaves) of an object to be heated placed on the placing table used also as the bottom surface of the heating chamber 11, and the heating (heating by radiant heat and steam) of an object to be heated placed on the heating pan 30 can be performed within rated power by a series of treatments. Moreover, when the heating by both the heaters 21b and 21a is started, since the heating pan 30 is already heated to a certain degree of temperature, and heats the lower surface of the object to be heated on the heating pan. For this reason, it is not necessary to replace an object to be heated when heating is performed after switching from a certain heat source to another heat source, as in a conventional cooker, and can improve convenience in cooking for the user. In addition, even if the heating by the argon heater and the heating by the steam are used together, since the radio waves of a wavelength radiated from the argon heater have a wavelength which easily transmits the steam, the heating by the argon heater is not hindered by the steam.

Figure 25:
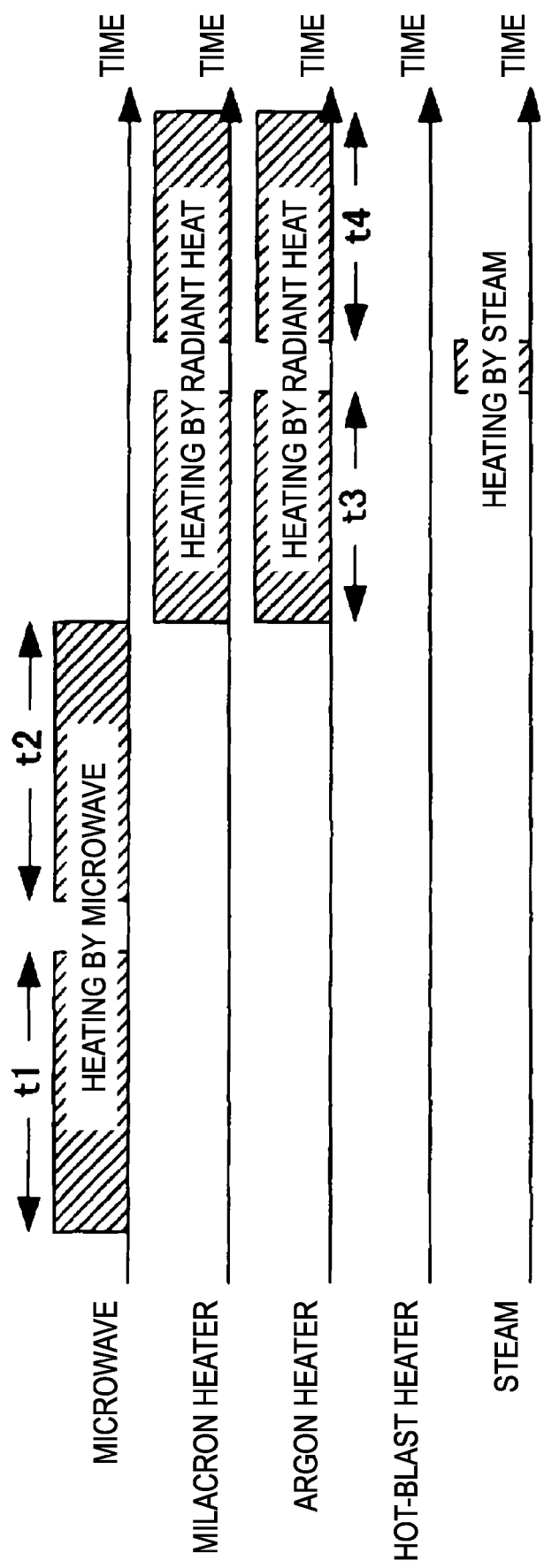
FIG. 25 is a time chart showing driving situations of respective heat sources during above and below heating treatment by the cooker of the embodiment of the invention.

In the time chart of FIG. 25, first, the object 12a to be heated placed on the placing table used also as the bottom surface of the heating chamber 11, and the heating pan 30 are heated by starting the supply of electric power to the high-frequency wave generating means 40, and radiating microwaves for a predetermined time t1 from the high-frequency wave generating means 40. In addition, at this time, the object 12b to be heated placed on the heating pan 30 is also heated by microwaves which pass through the peripheral portion of the heating pan 30, and propagate to the upper space partitioned by the heating pan 30. When the predetermined time t1 has elapsed after the high-frequency wave generating means 40 starts the radiation of microwaves, the supply of electric power to the high-frequency wave generating means 40 is first stopped, and a notification means, such as the operation panel 23 provided in the cooker of the invention, or a buzzer, is made to output a notification display, a notification sound, etc., thereby urging the taking out of the object 12a to be heated placed on the placing table used also as the bottom surface of the heating chamber 11. Thereafter, when the object 12a to be heated placed on the placing table used also as the bottom surface of the heating chamber 11 is taken out (for example, when a pressure sensor provided on the placing table used also as the bottom surface of the heating chamber 11 detects the taking out of the object 12a to be heated, or detects the opening and closing of a door 64 of the heating chamber 11), the heating pan 30 is heated by starting the supply of electric power to the high-frequency wave generating means 40 again, and radiating microwaves for the predetermined times t2 from the high-frequency wave generating means 40. As the situation where the object 12a to be heated placed on the placing table used also as the bottom surface of the heating chamber 11 is taken out, a case where the amount of load of the object 12a to be heated is small and the object to be heated can be sufficiently heated by the radiation of microwaves for a short period of time, or a case where it is desired to sufficiently heat the bottom surface (surface in contact with the heating pan 30) of the object 12b to be heated placed on the heating pan 30 can be considered. Since the microwaves radiated from the high-frequency wave generating means 40 can be most efficiently irradiated onto the heating pan 30 by taking out the object 12a to be heated first, the temperature of the heating pan 30 can be raised in a short period of time. In addition, the taking out of the object 12a to be heated mentioned above is not necessarily indispensable. The temperature of the heating pan 30 can be raised even if the object 12a to be heated is not taken out, by controlling the orientation of the rotating antennas 38 and 39 to radiate microwaves in orientations in which the microwaves are not directly radiated to the object 12a to be heated from the rotating antennas 38 and 39, after the predetermined time t1 has elapsed.

When the predetermined time t2 has elapsed after the high-frequency wave generating means 40 starts the radiation of microwaves, the supply of electric power to the high-frequency wave generating means 40 is stopped to start the supply of electric power to the Milacron heaters 21b and the argon heater 21a, and the object to be heated placed on the heating pan 30 is heated for a predetermined time t3 by the radiant heat from the Milacron heaters 21b and the argon heater 21a. Then, when the heating by radiant heat lasts for the predetermined time t3, the supply of electric power to the Milacron heaters 21b and the argon heater 21a is temporarily stopped, and in the meantime, the supply of electric power to the steam generating means 60 is supplied instead. After the heating by steam is temporarily performed, the supply of electric power to the Milacron heaters 21b and the argon heater 21a is started again. If the heating by the Milacron heaters 21b and the argon heater 21a lasts for a predetermined time t4, the supply of electric power to the Milacron heaters 21b and the argon heater 21a is stopped, and the heating by radiant heat is ended.

As shown on the time chart of FIG. 25, a cooking method which drives respective heat sources is suited to the cooking in a case where an object to be heated which has a small amount of load is placed on the placing table used also as the bottom surface of the heating chamber 11, a case where an object to be heated is composed of a material through which heat is easily transmitted, and can be sufficiently heated by microwaves for a short period of time, or a case where an object to be heated which needs preponderant heating of its bottom surface is placed on the heating pan 30. Additionally, the pipe heaters 21 are driven to issue steam into an environment of 100° C. or higher through the heating by steam for a short period of time, and thereby the steam becomes superheated steam. Since the steam encompasses and heats an object to be heated, the surface of the object to be heated can be uniformly browned, and the internal temperature of the object to be heated can be raised without burning. Additionally, if two objects to be heated are placed in the heating chamber and cooking is started by controlling the orientation of the rotating antennas 38 and 39 to radiate microwaves in orientations in which the microwaves are not directly radiated to the object 12a to be heated from the rotating antennas 38 and 39, the heating (heating by microwaves) of an object to be heated placed on the placing table used also as the bottom surface of the heating chamber 11, and the heating (heating by radiant heat and steam) of an object to be heated placed on the heating pan 30 can be performed within rated power by a series of treatments. Moreover, when the heating by both the heaters 21b and 21a is started, since the heating pan 30 is already heated to a certain degree of temperature, and heats the lower surface of the object to be heated on the heating pan. For this reason, it is not necessary to replace an object to be heated when heating is performed after switching from a certain heat source to another heat source, as in a conventional cooker, and can improve convenience in cooking for the user. In addition, even if the heating by the argon heater and the heating by the steam are used together, since the radio waves of a wavelength radiated from the argon heater have a wavelength which easily transmits the steam, the heating by the argon heater is not hindered by the steam.

Figure 26:
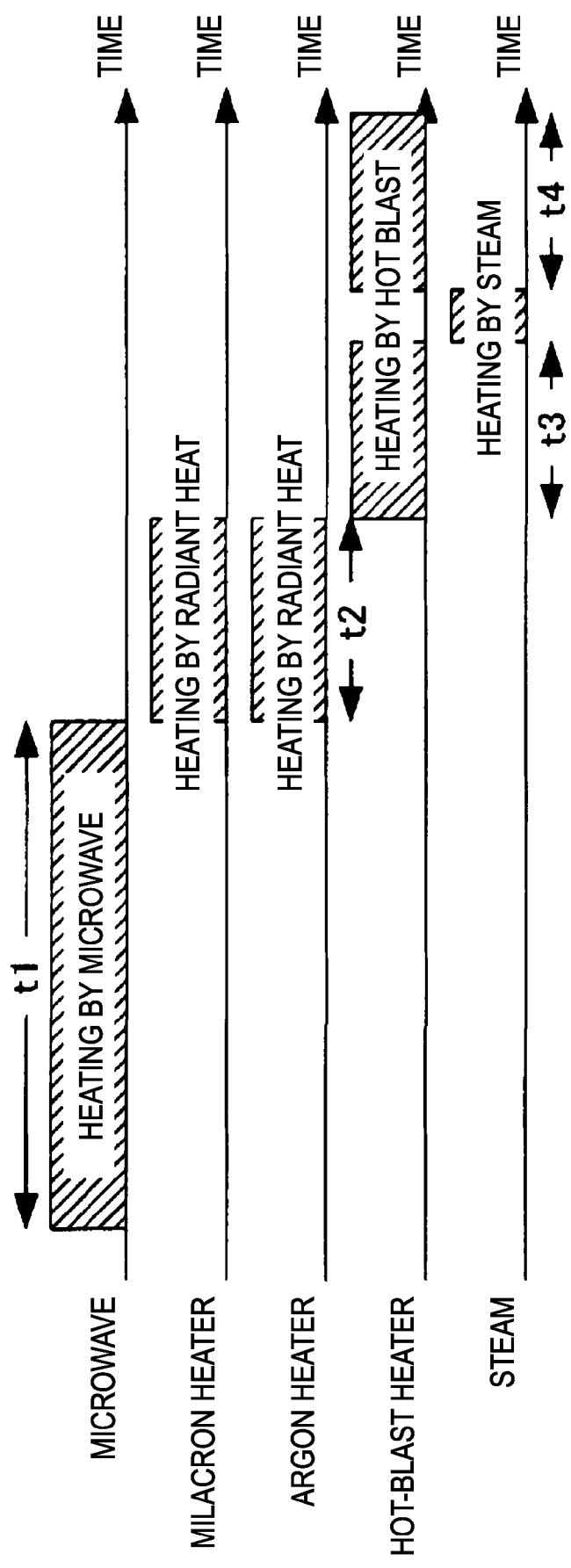
FIG. 26 is a time chart showing driving situations of respective heat sources during above and below heating treatment by the cooker of the embodiment of the invention.
Figure 27:
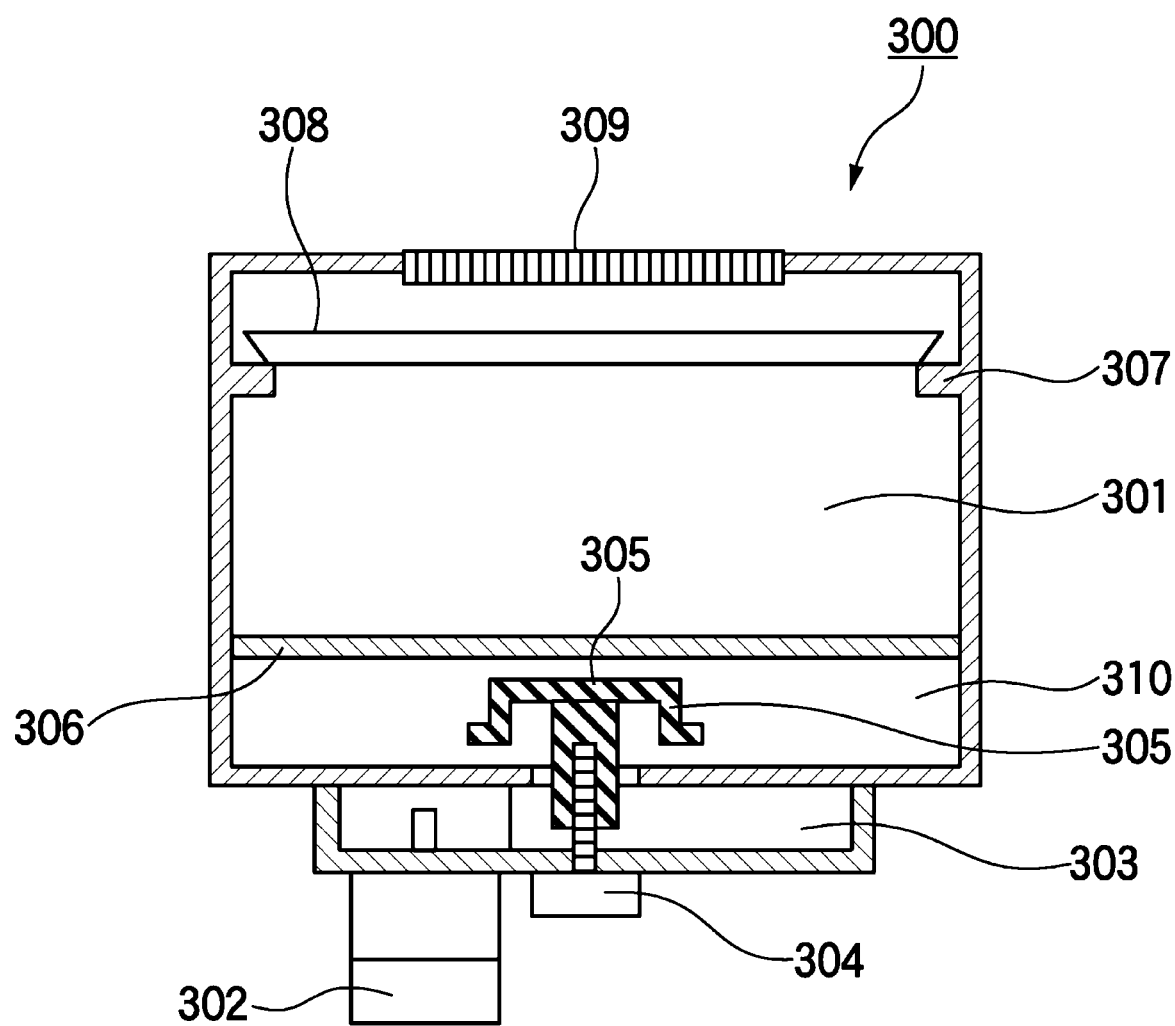
FIG. 27 is a configuration diagram of a conventional high-frequency wave heating device.

In the time chart of FIG. 26, first, the object 12a to be heated placed on the placing table used also as the bottom surface of the heating chamber 11, and the heating pan 30 are heated by starting the supply of electric power to the high-frequency wave generating means 40, and radiating microwaves for a predetermined time t1 from the high-frequency wave generating means 40. In addition, at this time, the object 12b to be heated placed on the heating pan 30 is also heated by microwaves which pass through the peripheral portion of the heating pan 30, and propagate to the upper space partitioned by the heating pan 30. When the predetermined time t1 has elapsed after the high-frequency wave generating means 40 starts the radiation of microwaves, the supply of electric power to the high-frequency wave generating means 40 is stopped to start the supply of electric power to the Milacron heaters 21b and the argon heater 21a, and the object to be heated placed on the heating pan 30 is heated for a predetermined time t2 by the radiant heat from the Milacron heaters 21b and the argon heater 21a. Then, when the heating by radiant heat lasts for the predetermined time t2, the supply of electric power to the Milacron heaters 21b and the argon heater 21a is stopped, and instead, the supply of electric power to the hot-air supply unit 80 is started, and the object to be heated placed on the heating pan 30 is heated for the predetermined time t3 by a hot blast. Then, when the heating by the hot blast lasts for the predetermined time t3, the supply of electric power to the hot-air supply unit 80 is temporarily stopped, and in the meantime, the supply of electric power to the steam generating means 60 is supplied instead. After the heating by steam is temporarily performed, the supply of electric power to the hot-air supply unit 80 is again started. When the heating by the hot-air supply unit 80 lasts for a predetermined time t4, the supply of electric power to the hot-air supply unit 80 is stopped, and the heating by the hot blast is ended.

As shown on the time chart of FIG. 26, a cooking method which drives respective heat sources is suited to the cooking in a case where the weight and volume of an object to be heated placed on the heating pan 30 are large (that is, in a case where the object to be heated has a size suitable for heating by a hot blast). For example, the cooking method is suited to the cooking in a case where a stewed dish is placed on the placing table used also as the bottom surface of the heating chamber 11, and bony chops are placed on the heating pan 30. Additionally, steam is issued into an environment where the temperature of the heating chamber is 100° C. or higher in a short time through the heating by the hot blast, and thereby the steam becomes superheated steam. Since the steam encompasses and heats an object to be heated, the internal temperature of the bony chops around the bone in which temperature hardly rises can be raised, and the surface of the object to be heated can be uniformly browned. Moreover, additional heating of a stew dish can be simultaneously performed. In addition, during the heating processes t3 and t4 by hot blast, the heating by hot blast and the heating by microwaves are alternately performed. If cooking is started by this cooking method after two objects to be heated (for example, a stew dish and bony chops) are placed in the heating chamber, the heating (heating by microwaves) of an object to be heated placed on the placing table used also as the bottom surface of the heating chamber 11, and the heating (heating by radiant heat, hot blast and steam) of an object to be heated placed on the heating pan 30 can be performed within rated power by a series of treatments. Moreover, when the heating by both the heaters 21b and 21a is started, since the heating pan 30 is already heated to a certain degree of temperature, and heats the lower surface of the object to be heated on the heating pan. For this reason, it is not necessary to replace an object to be heated when heating is performed after switching from a certain heat source to another heat source, as in a conventional cooker, and can improve convenience in cooking for the user.

The present application is based on Japanese Patent Application No. 2007-327783 filed on Dec. 19, 2007, the content of which is incorporated herein by reference.

As described above, although the various embodiments of the invention have been described, the invention is not limited to the matters shown in the embodiments. Changing or applying the invention by those skilled in the art on the basis of the description of the specification, or well-known techniques are scheduled by the invention and is included within a range where protection is required.

Industrial Applicability

As described above, according to the cooker of the invention, even in a state where an object to be heated is placed on the placing table used also as the bottom surface of the heating chamber, the temperature of the heating pan can be effectively raised by microwaves, and an object to be heated placed on the heating pan can also be heated by microwaves. In other words, the effect can be exhibited that objects to be heated can be placed and heated on both the placing table used also as the bottom surface of the heating chamber and the heating pan. Therefore, the invention is useful in the field related to a cooker which dielectrically heats objects to be heated.

The invention claimed is:

1. A cooker comprising:
    a heating chamber in which an object to be heated is placed on a placing table used also as a bottom surface thereof;
    a detachable heating pan which is detachably provided inside the heating chamber and on which an object to be heated is placed which is different from the object to be heated;
    a high-frequency wave supply unit which generates microwaves;
    an antenna which radiates the microwaves generated by the high-frequency wave supply unit;
    a heat supply unit which heats the object to be heated placed on the heating pan by heat radiation different from the microwave heating; and
    a control unit which controls heating treatment of the objects to be heated
    wherein when a first object to be heated is placed on the placing table used also as the bottom surface of the heating chamber, and a second object to be heated is placed on the heating pan, the control unit controls the second object to be heated so as to be heated by the heat supply unit after subjecting at least the first object to be heated to the microwave radiation, and stops operation after heating of the objects to be heated is completed.

2. The cooker according to claim 1, comprising:
    a steam supply unit which heats the object to be heated by steam,
    wherein the control unit controls to heat the first object to be heated or the second object to be heated by the steam supply unit.

3. The cooker according to claim 2,
    wherein the control unit performs a control to drive the steam supply unit so as to add heating by steam at a predetermined time after the second object to be heated begins to be heated by the heat supply unit.

4. The cooker according to claim 2,
    wherein the control unit performs a control to drive the steam supply unit so as to supply steam temporarily, during the heating of the second object to be heated by the heat supply unit.

5. The cooker according to claim 2,
    wherein the control unit performs a control to lower the output of microwaves before the second object to be heated begins to be heated by the heat supply unit so as to continue microwave heating, and to drive the steam supply unit to add heating by steam while the output of microwaves is lowered.

6. The cooker according to claim 2,
wherein the control unit performs a control to drive the steam supply unit to add heating by steam after the stop of the heating by the heat supply unit, and to complete the heating of the object to be heated and stop operation.

7. The cooker according to claim 1, comprising:
a notification unit,
wherein the control unit performs a control to stop the microwaves from the high-frequency wave supply unit temporarily, and to drive the notification unit at the stop.

8. The cooker according to claim 1, comprising:
a hot-air supply unit which supplies a hot blast to the heating chamber,
wherein the control unit performs a control to drive the heat supply unit and the hot-air supply unit alternately so as to add heating after microwaves are radiated.

9. The cooker according to claim 1,
wherein the heat supply unit comprises an optical heater, and
wherein the control unit performs a control so that the second object to be heated is heated by the optical heater.

10. The cooker according to claim 9,
wherein the optical heater is a steam transmissive heater.

* * * * *